(12) United States Patent
Ishihara

(10) Patent No.: US 7,023,498 B2
(45) Date of Patent: Apr. 4, 2006

(54) REMOTE-CONTROLLED APPARATUS, A REMOTE CONTROL SYSTEM, AND A REMOTE-CONTROLLED IMAGE-PROCESSING APPARATUS

(75) Inventor: Toshihide Ishihara, Suita (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 567 days.

(21) Appl. No.: 10/290,709

(22) Filed: Nov. 8, 2002

(65) Prior Publication Data

US 2003/0095212 A1    May 22, 2003

(30) Foreign Application Priority Data

Nov. 19, 2001   (JP)   ............... 2001-352753

(51) Int. Cl.
H04N 5/044 (2006.01)

(52) U.S. Cl. ............ 348/734; 340/825.22; 340/825.25; 340/825.72

(58) Field of Classification Search ............... 348/734; 340/825.22, 825.24, 825.25, 825.72; H04N 5/044
See application file for complete search history.

(56) References Cited

U.S. PATENT DOCUMENTS

| | | | | |
|---|---|---|---|---|
| 5,204,662 | A | * | 4/1993 | Oda et al. .............. 340/825.25 |
| 5,715,020 | A | * | 2/1998 | Kuroiwa et al. ............ 348/734 |
| 6,075,575 | A | * | 6/2000 | Schein et al. ................ 348/734 |
| 6,529,233 | B1 | * | 3/2003 | Allen ....................... 348/211.2 |
| 6,567,032 | B1 | * | 5/2003 | Mullaly et al. ............. 341/176 |
| 6,717,528 | B1 | * | 4/2004 | Burleson et al. ....... 340/825.72 |
| 6,775,386 | B1 | * | 8/2004 | Chou ......................... 381/110 |
| 6,812,881 | B1 | * | 11/2004 | Mullaly et al. ............. 341/176 |
| 2002/0024617 | A1 | * | 2/2002 | Kwon, II .................... 348/734 |
| 2002/0149705 | A1 | * | 10/2002 | Allen et al. ................. 348/734 |
| 2002/0174270 | A1 | * | 11/2002 | Stecyk et al. ................... 710/1 |
| 2004/0140882 | A1 | * | 7/2004 | Burleson et al. ........... 340/3.71 |
| 2005/0005288 | A1 | * | 1/2005 | Novak ......................... 725/32 |

FOREIGN PATENT DOCUMENTS

| | | |
|---|---|---|
| CN | 1307231 | 8/2001 |
| EP | 1111754 A2 | 6/2001 |
| JP | 7030982 | 1/1995 |
| JP | HEI 10-133849 | 5/1998 |
| JP | HEI 11-249687 | 9/1999 |
| JP | 2000050102 | 2/2000 |
| KR | 10-1996-028659 | 7/1996 |
| KR | 10-1998-077985 | 11/1998 |
| KR | 10-2000-0027981 A | 5/2000 |

* cited by examiner

Primary Examiner—Brian P Yenke
(74) Attorney, Agent, or Firm—Sheridan Ross P.C.

(57) ABSTRACT

A voice-signal/remote-control-pulse converter (30) receives a voice signal (S) by means of infrared rays (RV) from a remote control transmitter, and then performs voice recognition. An item of control information indicated by a recognized word (W) is converted into a control code (C) in the same format as that of a control code indicated by a remote control signal (RK). The control codes are entered into a remote control pulse selector (23) as respective remote control pulses P1 and P2 in the common format. The remote control pulse selector (23) enters exclusively one of the remote control pulses P1 and P2 into a remote control pulse decoder (24) in response to a remote-control-pulse switching signal (N).

8 Claims, 16 Drawing Sheets

FIG.9

| IMAGE | CONTENTS |
|---|---|
| PATTERN 1 | ANIMATED PATTERNS (INTERVAL OF DRAWING : 0.5 sec) |
| PATTERN 2 | ANIMATED PATTERNS (INTERVAL OF DRAWING : 0.5 sec) |
| PATTERN 3 | ANIMATED PATTERNS (INTERVAL OF DRAWING : 0.5 sec) |
| PATTERN 4 | MICROPHONE TEST — FORMANT LEVEL ±0 |
| PATTERN 5 | MICROPHONE TEST — FORMANT LEVEL −2 (H, G) |

REMOTE-CONTROLLED APPARATUS, A REMOTE CONTROL SYSTEM, AND A REMOTE-CONTROLLED IMAGE-PROCESSING APPARATUS

BACKGROUND OF THE INVENTION

The present invention relates to a system for remotely controlling the likes of household electrical apparatuses by means of key operations on a remote control transmitter and voices, in particular, a remote-controlled apparatus in the system, and further relates to an image-processing apparatus equipped with a GUI (graphical user interface) based on the system.

Recent household electrical apparatuses have acquired very enormous and various functions because of the advance of technology. For example, television (TV) sets have standard functions of channel selecting, turning on/off the power, adjusting the volume switching to the multichannel mode, and the like. In recent years, TV sets have further included such extensions to the functions as searching programs with EPG (electronic program guide), controlling over peripheral devices through i-Link (IEEE 1394) connection, and accessing to the Internet, as a result of functional digitalization and increase in the number of channels, which are associated with support for digital broadcasting.

The increase in the number of functions enhances the usefulness of devices, but complicates the operations, of the devices. Many household electric apparatuses include a remote control system with a remote control transmitter in order to simplify operations of users. In particular, apparatuses delivering a screen-display function (hereafter referred to as image-processing apparatuses), such as TV sets and video tape recorders (VTRs), implement a following GUI based on the remote control system. A user causes the apparatus to display an operation menu on the screen with the remote control transmitter. The user then moves the cursor appearing on the screen by means of key operations on the remote control transmitter, and thereby selects a category in the menu. When the selected category further includes subcategories, a menu of the subcategories appears on the screen. The user selects one of the subcategories in the menu through similar cursor operations. The image-processing apparatus performs the function corresponding to the thereby selected operation.

The above-described hierarchy of the menus increases in depth and complexity with a further increase in the number of the functions. Then, a selection of one of the categories generally requires a large number of steps of the movements through layers of the menus. Hence, the key operations on the remote control transmitter have to be repeated for a long time. Such long-time repeating of the key operations is not always easy for middle-aged and elderly users. Hence, a remote control system with voice control in addition to the key operations on the remote control transmitter has been developed. In the GUI based on the system, for example, the voices indicate the movements through layers of the menus, while the key operations on the remote control transmitter indicate the movements of the cursor on the screen. In this manner, the best use is made of the merits each of the voice control and the control with the key operations on the remote control transmitter, thereby improving the operability.

An example of conventional remote control systems is known as a remote voice-actuated control for VTR disclosed in "*Terebi Gijutsu,*" *Denshi Gijutsu Shuppan* (in Japanese), May 1991, pp. 38–44. This remote control system includes a VTR as a remote-controlled apparatus, and achieves the remote control over the VTR by means of key operations and voices through a remote control transmitter with a voice recognition device.

FIG. 13 is a block diagram showing the configuration of a remote control transmitter 100 included by the conventional remote control system. When a user presses a key of a keypad 101, a remote control pulse converter 102 selects a control code corresponding to the key, converts the control code into an electric signal, hereafter referred to as first remote control pulses P1, and sends out the signal. When the user speaks into a microphone 106 of the remote control transmitter 100, the voice is converted into a voice signal S through the microphone 106 and a low-frequency amplifier 107, and entered into a voice recognition section 108. The voice recognition section 108 compares the voice signal S with objects of voice recognition cataloged into a dictionary 109. The objects of voice recognition are cataloged usually on a word basis. The voice recognition section 108 selects a word W corresponding to the voice signal S from the dictionary 109, and then notifies an output controller 110. The output controller 110 accesses a control code storage section 111, and reads a control code C corresponding to the word W received. Here, the control code storage section 111 stores control codes corresponding to respective words cataloged into the dictionary 109. The output controller 110 reads the control code C, converts it into an electric signal (hereafter referred to as second remote control pulses P2), and sends out the signal. A remote control pulse selector 103 selects one of the first remote control pulses P1 and the second remote control pulses P2, and sends out it to an LED driver 104. The LED driver 104 causes an infrared light-emitting diode (LED) 105 to emit infrared rays according to the remote control pulses P received. For example, a pulse position modulation (PPM) is used as the modulation scheme of the infrared rays according to the remote control pulses. Thus, the infrared rays R modulated according to the remote control pulses P (hereafter referred to as remote control signal) are sent out to the VTR 200.

FIG. 14 is a block diagram showing a part relevant to remote control in the remote-controlled apparatus, that is, the VTR 200 in the above-described conventional remote control system. A photoreceptor 201 comprises a photoreceptor device such as a photodiode and receives the infrared rays from the outside. A remote control signal detector 202 detects the remote control signal R from the remote control transmitter 100 out of the infrared rays received by the photoreceptor 201, and converts the remote control signal R into the remote control pulses P. A remote control pulse decoder 203 decodes the remote control pulses P into a control code C. A device controller 204 accesses a control data storage section 205, reads a command or an item of control data D corresponding to the control code C, and then performs a predetermined operation according to the command or the item of control data D. Thus, the conventional remote control system achieves the remote control over the VTR 200 by means of the key operations and voices through the remote control transmitter 100.

The control codes are predetermined for the respective operations of the VTR 200 and the respective items of control data to be provided for the VTR 200. Separate control codes are assigned to, for example, the respective commands indicating the operations of turning on/off the power, recording, replaying, pausing, fast forwarding, rewinding, and the like, and the respective items of control data specifying the like of the target channel and the start/stop time for the recording. The control data storage section 205 stores the correspondences between the control codes and the commands and the correspondences between the control codes and the items of control data.

In the conventional remote control system, when an operation of the VTR 200 or a item of control data for the VTR 200 is indicated, the remote control transmitter 100 selects a common control code and converts it into a common remote control signal R, regardless of the indication by means of a key operation or a voice. Accordingly, the VTR 200 can utilize the common configuration shown in FIG. 14 for remote control, regardless of the indication by means of a key operation or a voice through the remote control transmitter.

The transmission of the remote control signals based on infrared rays requires preventing confusion with similar remote control signals from other remote control systems. Hence, separate remote control systems avoid the use of the same control codes. This restricts the number of control codes assigned to each of the remote control systems using infrared rays. More specifically, only the order of one byte (=256) of the control codes is assigned to each product category, for example. On the other hand, the functions of remote-controlled apparatuses are increasing in number as described above. For example, satellite digital broadcasting includes channels numbered theoretically 101–999, even if limited in use, 200–300. Accordingly, the number of the control codes is insufficient only for establishing simple correspondences with the increasing number of the channels. The shortage of the control codes is more serious when a remote control transmitter assigns common control codes to both of the indications by means of key operations and voices in a manner of the above-described conventional remote control system. In fact, the present voice recognition technology requires words as many as or more than groups of channels to be selected by voices indicating a channel selection. In another example, the order of 100 words to be identified is required for a program search with EPG indicated directly by voices. Thus, for each operation, the number of the control codes to be assigned to the indication by means of voices far exceeds the number of the control codes to be assigned to the indication by means of key operations. Therefore, only a very small number of the control codes can be shared between both indications by means of key operations and voices. Because of that, the above-described remote control system has poor potential for expansion in functionality.

Another conventional remote control system is disclosed in Japanese Laid-Open Patent Publication No. Hei 7-30982. This remote control system includes a VTR as a remote-controlled apparatus, and achieves the remote control over the VTR by means of key operations and voices through a remote control transmitter with a microphone. Here, in contrast to the above-described remote control system, the remote control transmitter performs frequency modulation on infrared rays according to user's voice itself, and transmits the infrared rays. Voice recognition is performed in the VTR, that is, the remote control receiver. Hence, the remote control system has greater potential for expansion in functionality than the above-described remote control system as follows.

FIG. 15 is a block diagram showing the configuration of a remote control transmitter 300 included in the conventional remote control system. The same reference symbols as those shown in FIG. 13 designate components similar to the conventional remote control transmitter 100 shown in FIG. 13. Furthermore, the above-mentioned description is cited regarding the details of the similar components.

When a user speaks to a microphone 106 of the remote control transmitter 300, the voice is converted into a voice signal S through the microphone 106 and a low-frequency amplifier 107, and entered into a frequency modulator 301. The frequency modulator 301 performs frequency modulation on a predetermined carrier according to the voice signal S. A remote control pulse selector 103 selects one of first remote control pulses P1 and the frequency-modulated voice signal PS, and sends out it to an LED driver 104. The LED driver 104 causes an infrared LED 105 to emit infrared rays according to either the first remote control pulses P1 or the frequency-modulated voice signal PS, thereby sending out a remote control signal R to the VTR 400.

FIG. 16 is a block diagram showing a part relevant to remote control and voice recognition in the remote-controlled apparatus in the above-described-conventional remote control system, that is, the VTR 400. Here, parts similar to those of the conventional VTR 200 shown in FIG. 14 are designated by the same reference symbols as those in FIG. 14.

A remote-control-pulse/voice-signal selector 401 normally selects a first remote control signal detector 202A as a destination. Then, the remote control signal R received by a photoreceptor 201 is entered into the first remote control signal detector 202A. The first remote control signal detector 202A detects the first remote control pulses P1 out of the remote control signal R. A remote control pulse decoder 203 decodes the first remote control pulses P1 into a control code C. A first device controller 204 accesses a first control data storage section 205, reads a command or an item of control data D1 corresponding to the control code C, and further performs a predetermined operation according to the command or the item of control data D1. Thus, the remote control is achieved by means of key operations on the remote control transmitter 300.

On the other hand, the remote voice-actuated control is performed as follows. A second remote control signal detector 202B monitors the remote control signals R sent out from the photoreceptor 201 to the remote-control-pulse/voice-signal selector 401, thereby searching specific remote control pulses PT for indicating the start of voice recognition among the signals. The specific remote control pulses PT are transmitted from the remote control transmitter 300, for example, through key operations on the remote control transmitter 300. When the second remote control signal detector 202B has detected the specific remote control pulses PT, a voice recognition startup controller 402 switches the destination of the outputs of the remote-control-pulse/voice-signal selector 401 to an FM detector 403. Then, the remote control signal R received by the photoreceptor 201 is entered into the FM detector 403, thereby causing the FM detector 403 to start up. The first remote control signal detector 202A also detects the specific remote control pulses PT. At that time, the remote control pulse decoder 203 sends out a predetermined trigger signal T to a voice recognition section 404, thereby causing the voice recognition section 404 to start up. The FM detector 403 detects the frequency-modulated voice signal PS among the remote control signals R, and decodes it into the original voice signal S. The voice recognition section 404 compares the decoded voice signal S with each object of voice recognition cataloged into a dictionary 405. The objects of voice recognition are cataloged usually on a word basis. The voice recognition section 404 selects a word W corresponding to the voice signal S from the dictionary 405, and then notifies a second device controller 406. The second device controller 406 accesses a second control data storage section 407, reads a command or an item of control data D2 corresponding to the word W received. Here, the second control data storage section 407 stores the commands and the items of control data corresponding to the respective words cataloged into the dictionary 405. The second device controller 406 further performs a predetermined operation according to the command or the item of control data D2.

In this remote control system, the remote-controlled apparatus or the VTR 400 includes the voice recognition section 404 and the dictionary 405 instead of the remote control transmitter 300. Accordingly, the size and power of the remote control transmitter 300 do not restrict the scaleup of the circuit associated with, for example, an enlargement of the vocabulary of the dictionary 405 and an upgrade of the algorithm. On the other hand, the remote control transmitter 300 transmits the voice signal itself by means of infrared rays. Accordingly, the indications by means of voices do not require the assignments of the control codes, thereby circumventing the restriction on the number of the control codes. Thus, the above-described remote control system has potential for expansion in the functionality of being voice-actuated and of performing the voice recognition itself.

The above-described remote control system may provide, for example, a following GUI specifically for the indications by means of voices. When the VTR 400 is connected to a TV set, the second device controller 406 controls screen display section 408 according to the indications by means of voices, thereby displaying predetermined images on the screen (hereafter referred to as TV screen) of the TV set. By the use of such an image processing function, information on the voice recognition is displayed on the TV screen and fed back to the user. The items of such information include, for example, notifications of the proper timing of speaking for the user, lists of words recognized and the candidates, and the details of operations recognized. In addition, information of errors, when the errors occur in the voice recognition, may appear on the TV screen. Through the feedback of such information displayed on the screen, the user easily adjusts pronunciations, speeds, intonations, and loudness likely to succeed in recognition.

In the likes of the conventional remote control system shown in FIGS. 13 and 14, the remote control transmitter assigns common control codes to the indications by means of key operations and voices. In this case, the number of the control codes assigned to each of the remote control systems is restricted, since the separate remote control systems avoid the use of the same control codes. Thus, in the likes of the remote control system shown in FIGS. 13 and 14, the number of the control codes is insufficient, and thereby expansion in functionality is difficult.

In the likes of the conventional remote control system shown in FIGS. 15 and 16, the remote-controlled apparatus performs voice recognition instead of the remote control transmitter. Accordingly, the size and power of the remote control transmitter do not restrict the scaleup of the circuit associated with expansion in the functionality of voice recognition. On the other hand, the remote control transmitter transmits the voice signal itself by means of the infrared rays. Accordingly, the available number of the control codes does not restrict the types of the indications by means of voices. Thus, the likes of the remote control system shown in FIGS. 15 and 16 have greater potential for expansion in functionality than the likes of the system shown in FIGS. 13 and 14.

Nevertheless, the likes of the conventional remote control system shown in FIGS. 15 and 16 have the following problem. In this remote control system, the remote-controlled apparatus such as the VTR 400 uses control information in the two data forms of remote control pulses and voice signals. Accordingly, the VTR 400 comprises separate control lines between the remote control pulses and the voice signals, as shown in FIG. 16. More specifically, the VTR 400 comprises two separate device controllers, the first device controller 204 according to the control codes C indicated by remote control pulses and the second device controller 406 according to words W entered by means of voices.

The size of the chassis restricts the overall size of the circuitry of these two device controllers. Accordingly, it is desirable that the two device controllers be designed on a single circuit board with a common CPU. However, the difference in data form between the items of control information, that is, the control codes C and the words W, complicates integration of the two device controllers. In particular, a substantial change is required by the chassis design in the configuration of the conventional remote control system based only on the remote control pulses, but it is undesirable because of technical difficulty and, in addition, an increase in cost.

BRIEF SUMMARY OF THE INVENTION

An object of the invention is to provide a remote control system based on both of key operations on a remote control transmitter and voices, which uses a conventional configuration with a minimum of changes and has plenty of potential for expansion in functionality. Another object of the invention is to provide an image-processing apparatus equipped with the remote control system and implementing a GUI that feeds back information on voice recognition to the users through screen displays, thereby achieving a preferable operability.

A remote-controlled apparatus according to the invention comprises:

(A) a remote control receiver for receiving a remote control signal and converting the remote control signal into first remote control pulses;

(B) a voice-signal/remote-control-pulse converter for receiving a voice signal, selecting a control code corresponding to the voice signal, and converting the control code into second remote control pulses;

(C) a remote control pulse selector for selecting one of the first remote control pulses and the second remote control pulses according to a predetermined switching signal (N); and (D) a remote-control-pulse processing section for decoding the remote control pulses selected by said remote control pulse selector into the control code and performing the control over operations according to the control code. Here, the remote control signal is sent out from, for example, an external remote control transmitter. The remote control transmitter comprises a plurality of keys, and transmits a control code corresponding to each of the keys pressed by a user, as a remote control signal. The above-mentioned remote-controlled apparatus, together with such a remote control transmitter, constitutes a remote control system.

The remote-controlled apparatus performs voice recognition. Then, the control information indicated by a voice signal recognized is converted into remote control pulses and sent out to the remote-control-pulse processing section. Thus, the control information to be processed by the remote-control-pulse processing section is expressed in the data form in common with that of the prior art, namely remote control pulses. Accordingly, the remote-control-pulse processing section permits a circuit configuration similar to that of the prior art to be shared, when the control information from the user is provided in either data form of remote control signals from the remote control transmitter and voice signals. In other words, the remote-control-pulse processing section is easily integrated as a single line similar to that of the prior art. As a result, the design of the chassis is simplified.

Under the enable control based on the switching signal, the remote control pulse selector enters the second remote control pulses into the remote-control-pulse processing section and interrupts the first remote control pulses sent out from the remote control receiver, when the voice-signal/remote-control-pulse converter sends out the second remote control pulses. Thus, the remote-control-pulse processing section processes exclusively one of the first remote control pulses and the second remote control pulses. Accordingly, a common control code may be assigned to separate functions between the first remote control pulses and the second remote control pulses. Furthermore, the voice-signal/remote-control-pulse converter and the remote control pulse selector may be interconnected, for example, within a common cabinet or with a cable, in order to prevent a leak of the second remote control pulses out of the remote-controlled apparatus. The control codes indicated by the second remote control pulses may thereby overlap those of other remote control systems. As a result, arbitrary category codes and data codes may be assigned as the control codes indicated by the second remote control pulses. That is, the number of the control codes indicated by the second remote control pulses is not restricted in contrast to the number of control codes indicated by the first remote control pulses. Thus, the above-mentioned remote-controlled apparatus achieves great potential for expansion in the functionality of being voice-actuated.

In the above-mentioned remote-controlled apparatus, preferably, (A) the voice-signal/remote-control-pulse-converter comprises:
  (a) a dictionary including objects of voice recognition;
  (b) a voice recognition section for calculating the degree of similarity between the voice signal and each of the objects of voice recognition, and selecting one of a candidate for the objects of voice recognition corresponding to the voice signal and an error code on the basis of the degrees of similarity;
  (c) a control code storage section for storing control codes each corresponding to the object of voice recognition and the error code; and
  (d) an output controller for reading a control code corresponding to one of the candidate for the object of voice recognition and the error code from the control code storage section, converting the control code into the second remote control pulses, and sending out the second remote control pulses to the remote control pulse selector together with the switching signal; and (B) the remote-control-pulse processing section comprises:
  (a) a remote control pulse decoder for decoding the remote control pulses selected by the remote control pulse selector, and converting the remote control pulses into a corresponding control code;
  (b) a control data storage section for storing control data and commands each corresponding to the control codes; and
  (c) a device controller for reading from the control data storage section an item of the control data and/or commands corresponding to the control code that the remote control pulse decoder decodes into, and performing a predetermined control over operations on the basis of the item of control data and/or commands.

This remote-controlled apparatus may, in particular, comprise a parameter storage section including a piece of nonvolatile media, wherein (A) the voice recognition section sends out voice recognition parameters to the output controller;
(B) the control code storage section stores control codes corresponding to the voice recognition parameters;
(C) the output controller reads the control code from the control code storage section, converts the control code into the second remote control pulses, and sends out the second remote control pulses to the remote control pulse selector;
(D) the control data storage section stores the voice recognition parameters corresponding to the control codes; and
(E) the device controller reads from the control data storage section the voice recognition parameters corresponding to the control code that the remote control pulse decoder decodes into, and writes the voice recognition parameters into the parameter storage section. Here, the nonvolatile media is preferably a flash memory, that is, a flash-EEPROM.

The voice recognition parameters include, for example, acoustic analysis parameters such as formant level (an index of frequency-versus-power spectrum shift depending on vocal tract length), and likelihood threshold values. Some of the control codes indicated by the second remote control pulses may be assigned to the voice recognition parameters since the number of the control codes is sufficiently large. Through the assignments, the parameter storage section can receive notification of the voice recognition parameters set by the voice recognition section. The voice recognition parameters are thus stored in nonvolatile media, and thereby the history of learning about the voice recognition is maintained regardless of power-up/down. This permits rapid optimization of the voice recognition parameters at turn-on again.

In the above-mentioned remote-controlled apparatus, the voice-signal/remote-control-pulse converter may comprise: (A) a voice input section for receiving a user's voice and converting the voice into the voice signal; and (B) a startup controller for starting the voice-signal/remote-control-pulse converter according to the amplitude of the voice signal.

This remote-controlled apparatus receives the user's voices directly or through a cable. Accordingly, a remote control system with this remote-controlled apparatus may include a remote control transmitter similar to that of the prior art. Furthermore, the voice-signal/remote-control-pulse converter starts up automatically through the detection of the amplitude of the voice signal, so that speaking to the remote-controlled apparatus is all the user needs to perform the remote voice-actuated control.

A remote control system according to the invention comprises:

(A) a remote control transmitter for transmitting the remote control signal and including: (a) a voice input section for receiving a user's voice and converting the voice into the voice signal; and (b) a wireless transmitter for modulating a carrier based on supersonic waves, infrared rays, or radio waves, according to the voice signal and sending out the carrier to the outside; and (B) the above-mentioned remote-controlled apparatus, wherein the voice-signal/remote-control-pulse converter includes: (a) a wireless receiver for receiving the carrier; and (b) a startup controller for starting the voice-signal/remote-control-pulse converter according to the amplitude of the carrier. In this remote control system, the remote-controlled apparatus receives the voice signals from the remote control transmitter through wireless communications. The voice input section may thereby be put near the user without limitations imposed by the likes of cables. This accordingly suppresses the mixing of the likes of ambient noises into the voice signal. Furthermore, the voice-signal/remote-control-pulse converter starts up automatically through the detection of the carrier, so that providing voices into the remote control transmitter is all the user needs to perform the remote voice-actuated control.

An image-processing apparatus according to the invention comprises a screen display section for displaying a predetermined image under the control of the device controller, and serving as the above-mentioned remote-controlled apparatus, wherein (A) the control data storage section stores the control data and commands for the screen display section and the view data to be displayed by the screen display section in a manner of establishing respective correspondences with predetermined control codes; and (B) the device controller reads from the control data storage section the view data corresponding to the control code that the remote control pulse decoder decodes the second remote control pulses into, and causes the screen display section to display the view data. Here, the above-mentioned view data may include text data. The text data has, for example, candidates for the objects of voice recognition, sentences indicating voice recognition errors, and voice recognition parameters. Alternatively, the view data may include image data. The image data has, for example, images indicating voice recognition errors, images indicating the proper timing of speaking, and images for displaying the voice recognition parameters, such as a formant level indicator.

The above-mentioned image-processing apparatus may provide, for example, a following GUI, especially for indications by means of voices. The device controller controls the screen display section according to the indications by means of voices, thereby displaying the above-mentioned view data on the screen. Then, the information about the voice recognition is visually fed back to the user. The items of such information include, for example, notifications of the proper timings of speaking, lists of words recognized and the candidates, and the details of operations recognized. In addition, information of errors, when the errors occur in the voice recognition, may appear on the TV screen. Through the feedback of such information displayed on the screen, the user easily adjusts, for example, pronunciations, speeds, intonations, and loudness likely to succeed in recognition.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

FIG. 9 is an illustration of items of image data appearing on a TV screen 28A in response to respective control codes concerning a GUI implemented in the DTV 20 according to Example 1 of the invention;

It will be recognized that some or all of the Figures are schematic representations for purposes of illustration and do not necessarily depict the actual relative sizes or locations of the elements shown.

DETAILED DESCRIPTION OF THE INVENTION

Regarding the best mode of the embodiment of the invention, the following describes some preferred-examples with reference to the drawings.

EXAMPLE 1

An image-processing apparatus according to Example 1 of the invention is a digital TV set (hereafter referred to as DTV). This DTV is equipped with a remote control system by means of key operations and voices through a remote control transmitter with a microphone.

Figure 1:
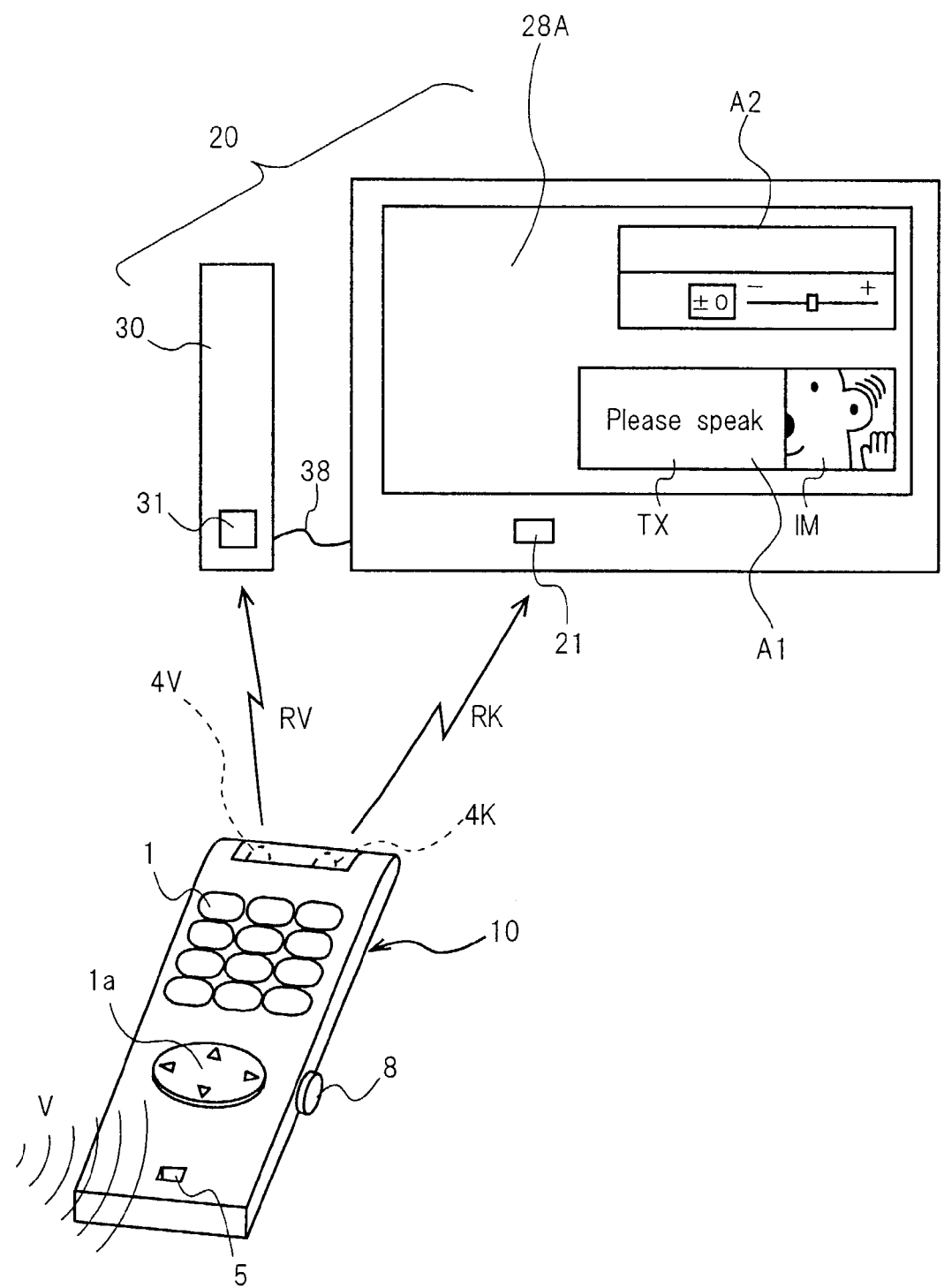
FIG. 1 is a schematic diagram showing the appearance of a remote control system with a DTV 20 according to Example 1 of the invention.

FIG. 1 is a schematic diagram showing the appearance of the remote control system with the DTV 20 according to Example 1 of the invention. A user presses a key of a keypad 1 on a remote control transmitter 10. Then, an item of control information corresponding to the key, such as a target channel number, is transmitted as a remote control signal RK based on, for example, infrared rays from a first infrared LED 4K to the DTV 20. The remote control signal RK is received by a first photoreceptor 21 of the DTV 20 and decoded into the corresponding item of the control information. Then, an operation indicated by the control information is performed. For example, a program on a channel corresponding to each key of the keypad 1 appears on a TV screen 28A. Thus, the remote control is achieved by means of key operations on the remote control transmitter 10.

The user enters a voice V indicating an item of control information for the DTV 20, such as a target channel number, into a microphone 5 with pressing and holding a talk button 8 on the remote control transmitter 10. Then, the voice V is converted into a voice signal RV based on, for example, infrared rays, and transmitted from a second infrared LED 4V to the DTV 20. The voice signal RV is received by a second photoreceptor 31 of a voice-signal/remote-control-pulse converter 30 and decoded into the corresponding item of control information. The control information decoded is transmitted to the main body of the DTV 20 through, for example, a cable 38, and then an operation indicated by the control information is performed. For example, a program on the target channel indicated by the voice V appears on the TV screen 28A. Thus, the remote voice-actuated control is achieved by means of press-to-talk operation with the remote control transmitter 10.

In the remote control system according to Example 1, the distance from the user to the microphone 5 is short since the remote control transmitter 10 includes the microphone 5. Accordingly, the likes of ambient noises are easily avoided from entering into the microphone 5. Therefore, the voice recognition is achieved with high precision.

Figure 2:
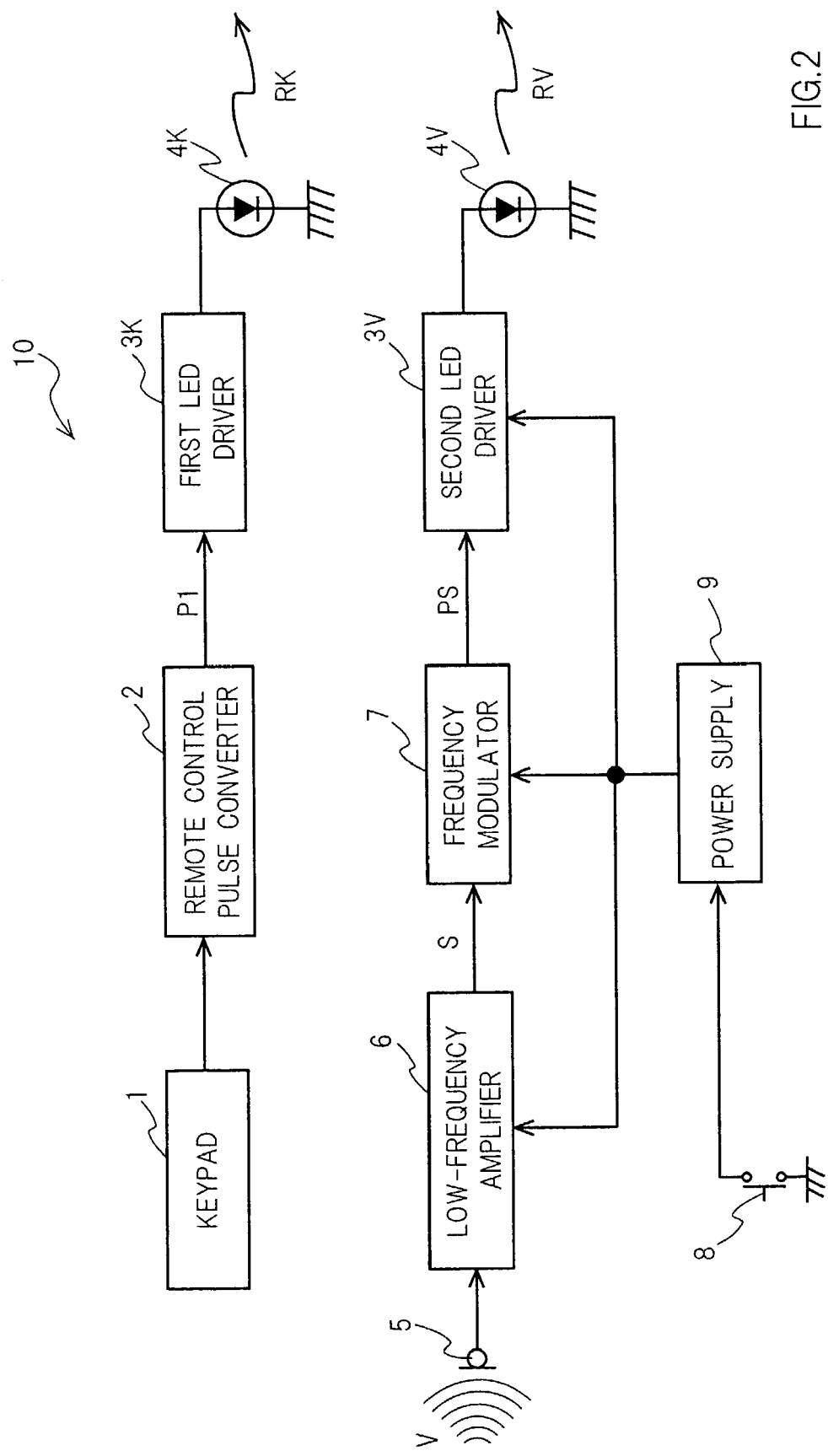
FIG. 2 is a block diagram showing the configuration of a remote control transmitter 10 included by the remote control system according to Example 1 of the invention.

FIG. 2 is a block diagram-showing the configuration of the remote control transmitter 10 included by the remote control system. The keypad 1 comprises, for example, channel-selection keys each corresponding to a channel number, an up/down/right/left key la for moving a cursor displayed on the TV screen 28A as a function of the GUI, and an enter key for entering, as shown in FIG. 1. The keys in the keypad 1 correspond to the respective items of control information. The items of control information include, for example, items of control data specifying the likes of target channels for recording, and commands indicating the operations of turning on/off the power, adjusting the volume, switching to multichannel mode, switching to display mode such as two-part split screen, and the like. The items of control information are expressed by respective codes in a predetermined format, hereafter referred to as control codes, and identified, for example, by a one-byte code. A remote control pulse converter 2 determines one of the keys of the keypad 1 pressed by the user, selects a control code corresponding to the key, and sends out the control code converted into an electric signal, hereafter referred to as first remote control pulses P1. A first LED driver 3K causes the first infrared LED 4K to blink according to the first remote control pulses P1. Then, the carrier is modulated under, for example, PPM. Thus, the modulated infrared rays, that is, the remote control signal RK is sent out to the DTV 20.

The control codes corresponding to the respective keys on the keypad 1 are transmitted to the DTV 20 by means of the remote control signal RK based on infrared rays. In this case, the DTV 20 uses, for example, the control codes previously registered with the Association for Electric Home Appliances (AEHA), in order to avoid confusing between the remote control signal RK and similar signals from other remote control systems. The format of the control codes defined by the AEHA (hereafter referred to as AEHA format) includes a one-byte category code and a one-byte data code. The category codes indicate a product category such as TV set and VTR, and are assigned to each vendor. Accordingly, under the AEHA format, the category codes identify the respective remote control systems. That is, the category codes are different between the separate remote control systems. Thus, the use of the same control codes is avoided between the separate remote control systems. The data codes indicate actual parts of control information. Accordingly, under the AEHA format, a maximum number of 256 codes are available as the control codes to each of the product categories, that is, to each of the remote control systems. Hence, the maximum number of the control codes available as the remote control signal RK to one of the remote control systems is restricted to 256 codes.

The microphone 5 receives the user's voice V and converts it into an electric signal. A low-frequency amplifier 6 extracts the frequency components corresponding to the voice V from the electric signal converted by the microphone 5, and sends out the components as a voice signal S. A frequency modulator 7 performs frequency modulation on a predetermined high-frequency carrier according to the variation in amplitude of the voice signal S, and sends out the carrier as a frequency-modulated wave signal PS. A second LED driver 3V varies the amount of current passing through a second infrared LED 4V according to the frequency-modulated wave signal PS based on the voice signal, and thereby the second infrared LED 4V varies the emission power according to the frequency-modulated wave signal PS. Thus, the voice signal RV based on the modulated infrared rays is sent out to the DTV 20.

The first infrared LED 4K and the second infrared LED 4V emit preferably infrared rays of separate wavelengths. This permits the DTV 20 to easily discriminate between the remote control signal RK and the voice signal RV based on infrared rays. Alternatively, the first infrared LED 4K and the second infrared LED 4V may share a common infrared LED, and the first LED driver 3K and the second LED driver 3V may share a common LED driver. In this case, some modifications may be required. For example, the-remote control signal RK and the voice signal RV based on infrared rays may include separate identification codes.

The talk button 8 is a switch for activating a power supply 9. The power supply 9, when it is activated, supplies electric power to the low-frequency amplifier 6, the frequency modulator 7, and the second LED driver 3V. Only during the time when the user presses and holds the talk button 8, the voice V of the user is transmitted to the DTV 20 as the voice signal RV based on infrared rays. Thus, the remote control transmitter 10 achieves the transmission of the voice V through press-to-talk operation.

Figure 3:
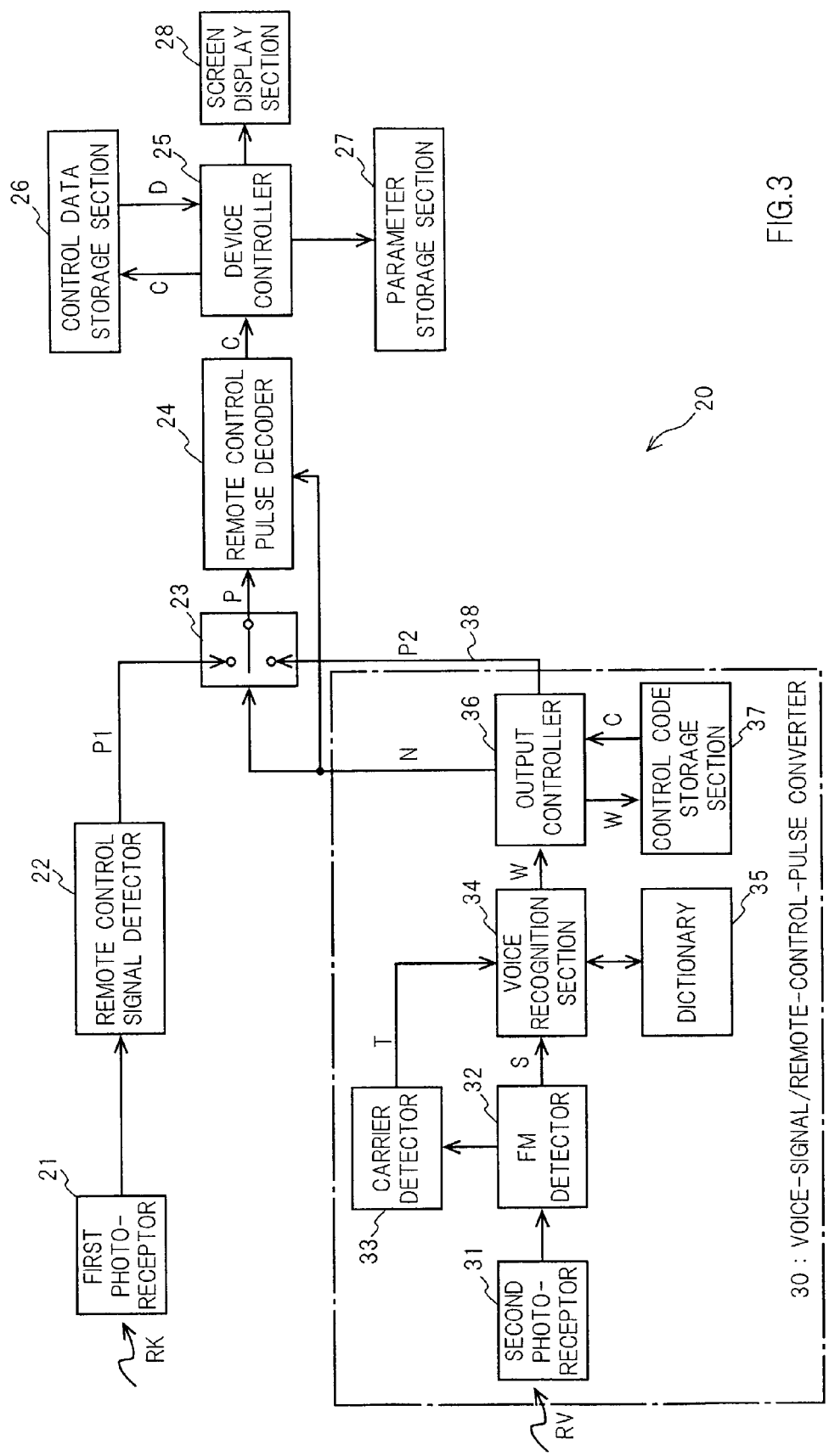
FIG. 3 is a block diagram showing a part relevant to the remote control system in the DTV 20 according to Example 1 of the invention.

FIG. 3 is a block diagram showing a part relevant to the remote control system in the DTV 20. A first photoreceptor 21 comprises a photoreceptor device such as a photodiode, and thereby detects infrared rays from the outside. Here the wavelength of the target infrared rays to be detected is equal to that of the first infrared LED 4K of the remote control transmitter 10. A remote control signal detector 22 distinguishes the remote control signal RK of the remote control transmitter 10 among the infrared rays detected by the first photoreceptor 21, and converts the remote control signal RK into first remote control pulses P1. A remote control pulse selector 23 normally selects a remote control signal detector 22 as the source. That is, the first remote control pulses P1 are normally provided to the remote control pulse decoder 24. The remote control pulse decoder 24 decodes the first remote control pulses P1 into a control code C, and then notifies a device controller 25. The device controller 25 accesses a control data storage section 26 when it receives the control code C. The control data storage section 26 stores commands and items of control data corresponding to the respective control codes. The device controller 25 reads from the control data storage section 26 the command and/or the item of control data D corresponding to the control code C received. Furthermore, the device controller 25 controls each section of the functions such as a screen display section 28 according to the command and/or the item of control data D, and performs a predetermined operation.

The voice-signal/remote-control-pulse converter 30 with the following configuration receives the voice signal RV based on infrared rays from the remote control transmitter 10, and performs voice recognition on the signal. The items of control information indicated by the voice recognized are encoded in the format in common with the control codes indicated by the first remote control pulses P1. The encoded items of control information, that is, control codes, are provided as an electric signal in the format in common with the first remote control pulses P1, hereafter referred to as second remote control pulses P2. A second photoreceptor 31 comprises a photoreceptor device such as a photodiode, and detects infrared rays from the outside. Here, the wavelength of the target infrared rays to be detected is equal to that of the second infrared LED 4V of the remote control transmitter 10. An FM detector 32 extracts the carrier from the second infrared LED 4V of the remote control transmitter 10 among the infrared rays received by the second photoreceptor 31, and then notifies a carrier detector 33. Furthermore, the FM detector 32 detects the frequency-modulated wave based on the voice signal from the frequency fluctuation in the carrier and decodes the wave into the original voice signal S.

The carrier detector 33 compares the amplitude of the carrier extracted by the FM detector 32 with a constant level. When the amplitude of the carrier increases and exceeds the constant level, the carrier detector 33 causes a voice recognition startup signal T to transition to its logical true state, hereafter referred to as to assert. On the other hand, when the amplitude of the carrier drops below the constant level, the carrier detector 33 causes the voice recognition startup signal T to transition to the logical false state, hereafter referred to as to negate. Here, high/low voltages with positive logic, and vice versa with negative logic, represent the logical true/false states, respectively.

A voice recognition section 34 activates during the assertion of the voice recognition startup signal T from the carrier detector 33. The voice recognition section 34 compares the voice signal S from the FM detector 32 with each object of voice recognition cataloged into a dictionary 35. The objects of voice recognition are cataloged usually on a word basis. The voice recognition section 34 selects a word W corresponding to the voice signal S from the dictionary 35, and then notifies an output controller 36. The output controller 36, when it receives the word W from the voice recognition section 34, accesses a control code storage section 37. The control code storage section 37 stores control codes corresponding to the respective words cataloged into the dictionary 35. The output controller 36 reads from the control code storage section 37 a control code C corresponding to the word W indicated by the voice recognition section 34. Here, the control codes C stored in the control code storage section 37 are defined in the format in common with the control codes indicated by the first remote control pulses P1, such as the AEHA format. Then, a two-byte code identifies each of the control codes C. The output controller 36 converts the control code C read from the control code storage section 37 into second remote control pulses P2, and sends out the second remote control pulses P2 to the remote control pulse selector 23.

The output controller 36 asserts a remote-control-pulse switching signal N at the start of the transmission of the second remote control pulses P2. Following a wait of a predetermined duration, for example, 100 msec, after the asserting, the output controller 36 sends out the second remote control pulses P2 to the remote control pulse selector 23, for example, over a cable 38. During the assertion of the remote-control-pulse switching signal N, the remote control pulse selector 23 selects the output controller 36 as the source. Thus, the second remote control pulses P2 are transmitted to the remote control pulse decoder 24. The remote control pulse decoder 24 decodes the second remote control pulses P2 into the control code C. Here, the remote control pulse decoder 24 can decode the second remote control pulses P2 with disregarding the differences from the first remote control pulses P1, since the second remote control pulses P2 have the format in common with the first remote control pulses P1.

The start of the input of the second remote control pulses P2 to the remote control pulse decoder 24 is delayed by the duration of the above-mentioned wait behind the switching between the inputs of the remote control pulse selector 23. The remote control pulse decoder 24 judges the delay to be no input of the remote control pulses (NOP: no operation), thereby discriminating clearly between the second remote control pulses P2 subsequently entered and the first remote control pulses P1 previously entered. The remote control pulse decoder 24 notifies the device controller 25 of the control code C. At that time, the remote control pulse decoder 24 detects the assertion of the remote-control-pulse switching signal N and notifies the device controller 25 that the source of the control code C is the voice-signal/remote-control-pulse converter 30.

The control codes indicated by the second remote control pulses P2 have the format in common with the control codes indicated by the first remote control pulses P1. Accordingly, the device controller 25 can process both the remote control pulses similarly without discrimination. More specifically, the device controller 25, when it receives the control code C indicated by the second remote control pulses P2, accesses the control data storage section 26. The control data storage section 26 stores commands and items of control data corresponding to the respective control codes. The device controller 25 reads from the control data storage section 26 a command and/or a item of control data D corresponding to the control code C received, controls each section of the functions such as a screen display section 28 according to the command and/or the item of control data D, and performs a predetermined operation. Thus, in the remote control system according to Example 1, the remote control pulse decoder 24 and the device controller 25 are shared for both of the first remote control pulses P1 and the second remote control pulses P2, especially integrated into a single line of control circuitry similar to the prior art. This simplifies the design of the chassis.

The second remote control pulses P2 are transmitted only from the voice-signal/remote-control-pulse converter 30 to the remote control pulse selector 23, for example, through the cable 38. That is, there is no leakage of the second remote control pulses P2 to the outside of the DTV 20. Accordingly, the second remote control pulses P2 are not received by other remote-controlled apparatuses similar to the DTV 20 in contrast to the first remote control pulses P1. Therefore, the control codes indicated by the second remote control pulses P2 may overlap the control codes of other remote control systems in contrast to the control codes indicated by the first remote control pulses P1. For example, under the AEHA format, the total number of the control codes indicated by the first remote control pulses P1 is restricted to the amount of the data code (1 byte=256, at maximum). On the other hand, the total number of the control codes indicated by the second remote control pulses P2 is permitted to increase at up to the total amount of the category code and the data code (2 bytes=4096). Thus, an abundance of the control codes is available to the items of control information indicated by voices in the remote control system according to Example 1. As a result, the remote control system has great potential for expansion in the functionality of being voice-actuated.

Figure 4:
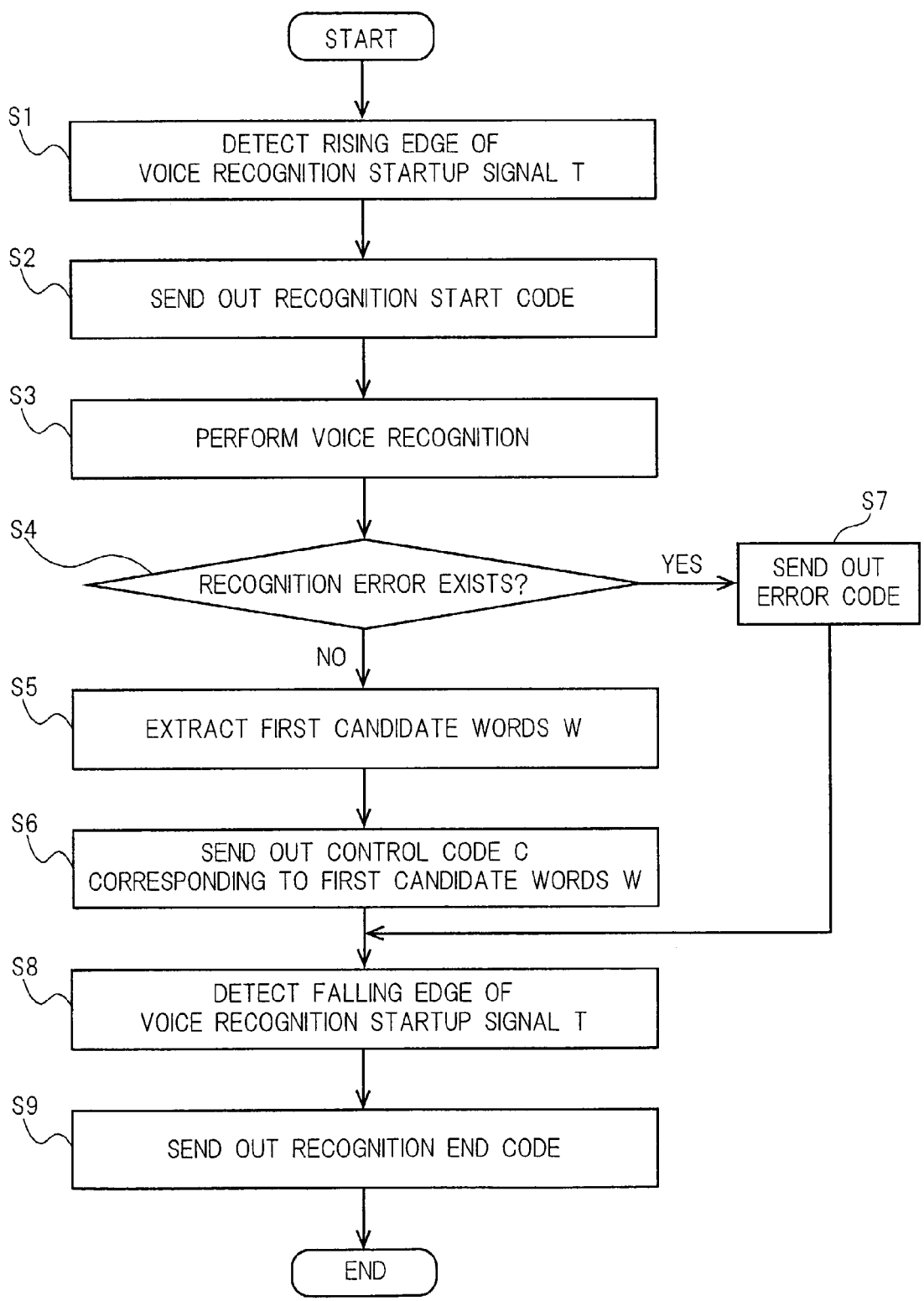
FIG. 4 is a flowchart showing the details of operation of a voice-signal/remote-control-pulse converter 30 according to Example 1 of the invention.

The DTV 20 according to Example 1 with the above-mentioned configuration achieves especially the remote voice-actuated control through the following steps. FIG. 4 is a flowchart showing the details of operations of the voice-signal/remote-control-pulse converter 30.

<Step S1>
A user enters a voice V indicating an item of control information into the microphone 5 with pressing and holding the talk button 8 on the remote control transmitter 10. Then, the second infrared LED 4V emits light, thereby sending out the carrier based on the infrared rays to the DTV 20. The voice V of the user is transmitted as the frequency modulation of the carrier. The FM detector 32 extracts the carrier of the second infrared LED 4V of the remote control transmitter 10 among infrared rays detected by the second photoreceptor 31, and then notifies the carrier detector 33. When the amplitude of the carrier increases and exceeds the constant level, the carrier detector asserts the voice recognition startup signal T. The voice recognition section 34 detects the rising edge of the voice recognition startup signal T.

<Step S2>
The voice recognition section 34 notifies the output controller 36 of the assertion of the voice recognition startup signal T. Then, the output controller 36 converts a control code indicating the start of voice recognition, hereafter referred to as recognition start code, into second remote control pulses P2, and sends out the second remote control pulses P2.

<Step S3>
The FM detector 32 detects the frequency-modulated wave of voice signal on the carrier and decodes the wave into the original voice signal S. The voice recognition section 34 performs the recognition process on the voice signal S. More specifically, the voice recognition section 34 begins by comparing the voice signal S with each of the words W cataloged into the dictionary 35, thereby calculating the degree of similarity, namely the likelihood between the voice signal and each of the words. Next, the voice recognition section 34 determines the first candidate word W according to predetermined criteria based on the likelihoods.

<Step S4>
It is judged whether the voice recognition has been successfully performed or not, that is, whether the first candidate word W has been properly determined or not. An occurrence of recognition errors is judged when the first candidate word W is not determined for the reason that, for example, for any of the words cataloged into the dictionary 35, the likelihood calculated does not meet the predetermined criteria. When no recognition error occurs, the process goes to Step S5. When a recognition error occurs, the process branches to Step S7.

Here, occurrences of recognition errors are judged also in the following cases. When the user aborts by mistake the pressing of the talk button 8 on the remote control transmitter 10 during the speaking, the emission of the second infrared LED 4V abruptly stops in the remote control transmitter 10. Then, in the voice-signal/remote-control-pulse converter 30, the amplitude of the carrier extracted by the FM detector 32 abruptly drops below the constant level set by the carrier detector 33. Similar abrupt drops of the carrier amplitude during the speaking occur also when obstructions cut off the infrared rays RV emitted from the second infrared LED 4V of the remote control transmitter 10, or when the power of the second infrared LED 4V seriously drops because of a battery exhaustion of the remote control transmitter 10. The carrier detector 33 negates the voice recognition startup signal T in response to the drop of the carrier amplitude. The voice recognition section 34, on detection of the falling edge of the voice recognition startup signal T, halts the recognition process and measures the average power of the voice signal during a constant duration immediately before the halt. If the average power equals or exceeds a constant threshold, it is judged that the recognition error of "carrier loss during speaking" occurs.

<Step S5>
The output controller 36 extracts the first candidate word W from the voice recognition section 34.

<Step S6>
The output controller 36 accesses the control code storage section 37, and reads a control code C corresponding to the first candidate word W from the control code storage section 37. Furthermore, the output controller 36 converts the control code C into second remote control pulses P2 and sends out the second remote control pulses P2.

<Step S7>
The voice recognition section 34 aborts the recognition process, and then notifies the output controller 36 of items of information on recognition errors organized by their factors. The output controller 36 reads a control code corresponding to the item of information received, hereafter referred to as error code, from the control code storage section 37. The output controller 36 then converts the error code into second remote control pulses P2, and sends out the second remote control pulses P2.

<Step S8>
The user stops to press the talk button 8 of the remote control transmitter 10. Then, the emission of the second infrared LED-4V stops in the remote control transmitter 10. In the voice-signal/remote-control-pulse converter 30, the amplitude of the carrier extracted by the FM detector 32 drops below the constant level set by the carrier detector 33.

At that time, the carrier detector 33 negates the voice recognition startup signal T. The voice recognition section 34 detects the falling edge of the voice recognition startup signal T.

<Step S9>

The voice recognition section 34 notifies the output controller 36 of the negation of the voice recognition startup signal T. Then, the output controller 36 converts a control code indicating the end of voice recognition, hereafter referred to as recognition end code, into second remote control pulses P2, and sends out the second remote control pulses P2.

Figure 5:
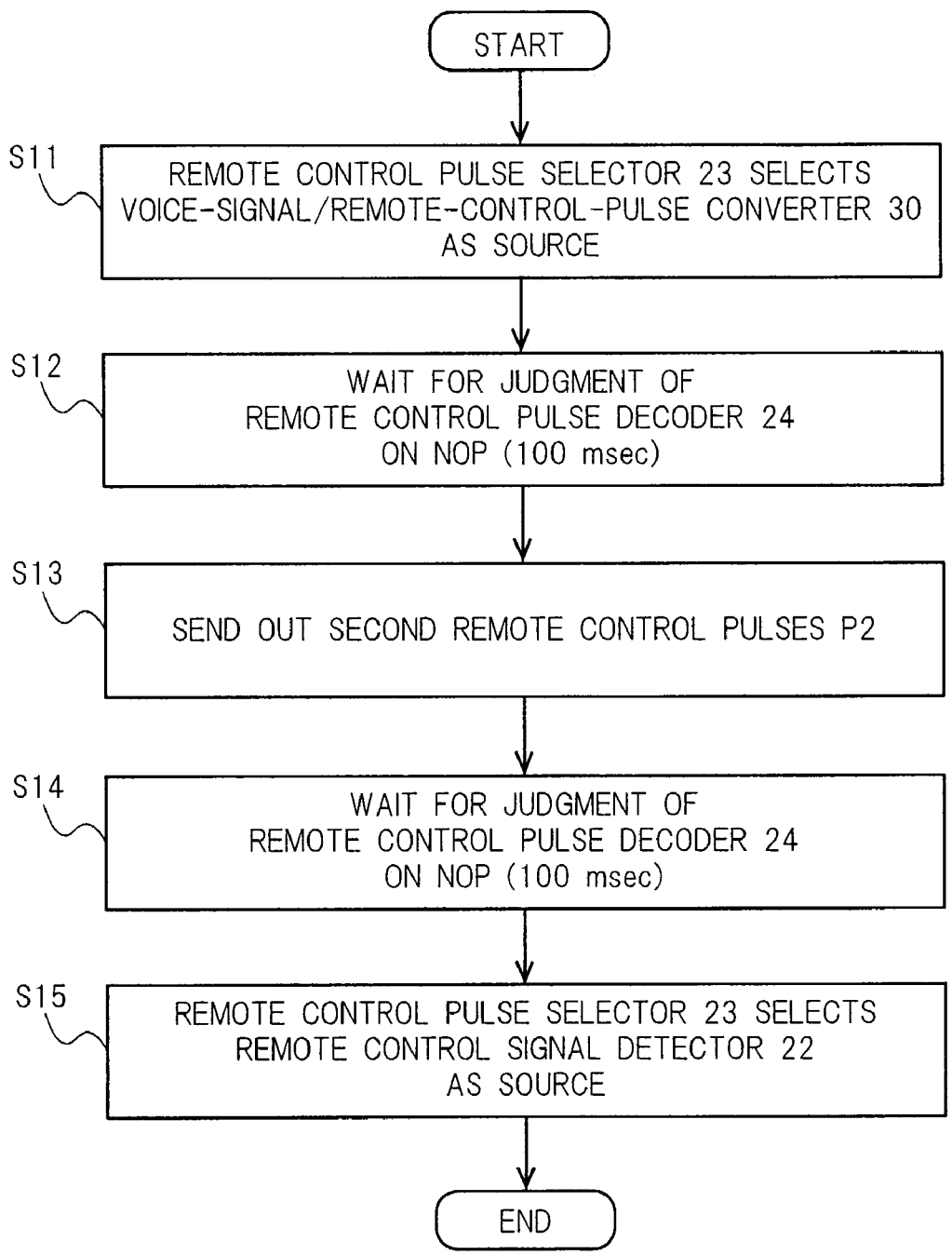
FIG. 5 is a flowchart showing the details of the switching between first remote control pulses P1 and second remote control pulses P2 concerning a remote control pulse selector 23 according to Example 1 of the invention.

FIG. 5 is a flowchart showing the details of the switching between first remote control pulses P1 and second remote control pulses P2 by the remote control pulse selector 23.

<Step S11>

In the voice-signal/remote-control-pulse converter 30, the output controller 36 asserts the remote-control-pulse switching signal N before a transmission of second remote control pulses P2. The remote control pulse selector 23, on detection of the assertion of the remote-control-pulse switching signal N, selects the output controller 36 as the source. Then, the input to the remote control pulse selector 23 is switched from first remote control pulses P1 to second remote control pulses P2.

<Step S12>

The output controller 36 waits for a duration of, for example, about 100 msec after the instant of asserting the remote-control-pulse switching signal N. During the wait, no remote control pulse is entered into the remote control pulse decoder 24. Then, the remote control pulse decoder 24 judges NOP.

<Step S13>

About 100 msec after the instant of asserting the remote-control-pulse switching signal N, the output controller 36 sends out second remote control pulses P2 to the remote control pulse selector 23. The remote control pulse decoder 24 decodes the second remote control pulses P2 into a control code C, and then notifies the device controller 25 of the control code C.

<Step S14>

The output controller 36, on completion of the sending out of the second remote control pulses P2, waits for about 100 msec. During the wait, no remote control pulse is entered into the remote control pulse decoder 24. Then, the remote control pulse decoder 24 judges NOP.

<Step S15>

About 100 msec after the completion of the sending out of the second remote control pulses P2, the output controller 36 negates the remote-control-pulse switching signal N. The remote control pulse selector 23 detects the negation of the remote-control-pulse switching signal N, selects again the remote control signal detector 22 as the source. Then, the input to the remote control pulse selector 23 is switched from second remote control pulses P2 to first remote control pulses P1.

As described above, the remote control pulse selector 23 enters exclusively one of first remote control pulses P1 and second remote control pulses P2 into the remote control pulse decoder 24, thereby avoiding collisions between both of the pulses. Thus, the sharing of the remote control pulse decoder 24 and the device controller 25 can be successfully achieved between the remote control by means of key operations on the remote control transmitter 10 and the remote voice-actuated control. Furthermore, the control codes for the voice-signal/remote-control-pulse converter 30 may overlap the control codes for the -remote control transmitter 10.

In the switching of remote control pulses by the remote control pulse selector 23, the input to the remote control pulse decoder 24 is actually switched after a constant duration of the halt. The remote control pulse decoder 24 judges the halt to be NOP and precisely discriminates between the remote control pulses entered before and after the halt. In other words, the decoder prevents the first remote control pulses P1 and the second remote control pulses P2 entered before and after the halt, respectively, from being confused with a series of remote control pulses. Accordingly, the remote control pulse decoder 24 can precisely decode both of the first remote control pulses P1 and the second remote control pulses P2 into respective control codes, even when both of the remote control pulses are frequently switched.

Figure 6:
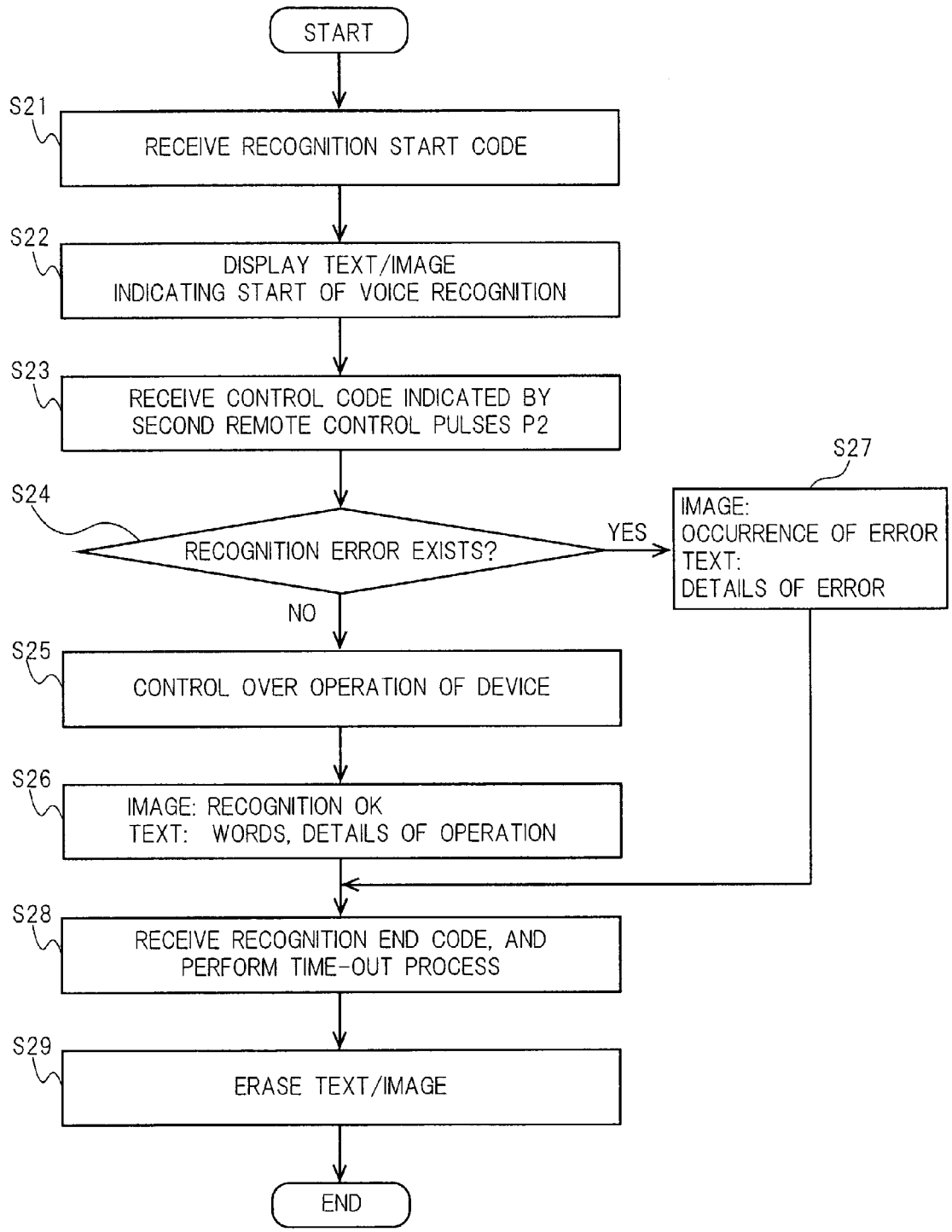
FIG. 6 is a flowchart showing the details of operation of a device controller 25 concerning remote voice-actuated control in the DTV 20 according to Example 1 of the invention.

FIG. 6 is a flowchart showing the details of operations of the device controller 25 of the DTV 20 concerning the remote voice-actuated control.

<Step S21>

The device controller 25 receives a recognition start code from the voice-signal/remote-control-pulse converter 30. Then, the device controller 25 accesses the control data storage section 26 and reads items of the control data corresponding to the recognition start code. Here, the items of the control data includes, for example, text data and/or image data indicating the start of voice recognition, and commands for instructing the screen display section 28 to display these data on the TV screen.

<Step S22>

The device controller 25 causes-the screen display section 28 to display the text data and/or the image data on the TV screen under the control according to the above-mentioned commands.

<Step S23>

The device controller 25 receives the control code indicated by the second remote control pulses P2. Then, the device controller 25 accesses the control data storage section 26 and reads items of the control data corresponding to the control code. When the voice-signal/remote-control-pulse converter 30 has properly determined the first candidate word. W, the items of the control data and/or commands corresponding to the word W is read from the control data storage section 26. On the other hand, when the control code received by the device controller 25 is an error code, items of the information on the recognition error indicated by the error code is read from the control data storage section 26.

<Step S24>

It is judged whether the control data read from the control data storage section 26 is the information on a recognition error or not. When the control data is not the information on any recognition error, the process goes to Step S25. Otherwise, the process branches to Step S27.

<Step S25>

The device controller 25 controls sections of the functions in the DTV 20 according to the control data corresponding to the first candidate word W determined by the voice-signal/remote-control-pulse converter 30. For example, when the control data includes the command for switching channels and the number of the target channel, the device controller 25 causes the screen display section 28 to display a program of the target channel on the TV screen under the control according to the control data.

\<Step S26\>

The device controller 25 reads from the control data storage section 26 items of the text data indicating the first candidate word W and causes the screen display section 28 to display the text data on the TV screen. Furthermore, the device controller 25 may read from the control data storage section 26 items of the image data indicating the success in voice recognition and cause the screen display section 28 to display the image data on the TV screen. Thus, the user is notified of the details of operations performed by the DTV 20 under the voice control.

\<Step S27\>

The device controller 25 reads from the control data storage section 26 items of the text data indicating the factors of the recognition errors and causes the screen display section 28 to display the text data on the TV screen. Furthermore, the device controller 25 may read from the control data storage section 26 items of the image data indicating the recognition errors and cause the screen display section 28 to display the image data on the TV screen. Thus, the user is notified of the fact that the DTV 20 cannot recognize the indications by means of the voices, together with the factors of the recognition errors.

\<Step S28\>

The device controller 25 receives the recognition end code. Then, the device controller 25 performs a time-out process and maintains the text data and/or the image data on display for a constant duration in Step S26 or S27.

\<Step S29\>

The device controller 25 causes the screen display section 28 to erase the text data and/or the image data on display in Step S26 or S27 under the control.

In Step S26 or S27, the items of the information on the result of voice recognition by the DTV 20 are displayed on the TV screen as the text data and/or the image data. Thus, the user can visually understand whether the indications by means of the voices have been correctly recognized. Furthermore, the user can visually understand the details of the recognition error if it occurs. In addition, the user can visually understand the next timing of speaking for the indications by means of the voices, through adjusting the display time of the text data and/or the image data in Step S28.

The number of the control codes indicated by the second remote control pulses P2 is not restricted in contrast to the number of the control codes indicated by the first remote control pulses P1. Accordingly, there is an abundance of the control codes indicated by the second remote control pulses P2. For example, some of these control codes may be assigned to the voice recognition parameters set by the voice recognition section 34. Here, the voice recognition parameters include, for example, acoustic analysis parameters such as formant level, and likelihood threshold values.

The voice recognition section 34 may notify the device controller 25 of the voice recognition parameters. The device controller 25 writes the received values of the voice recognition parameters on a type-by-type basis into the parameter storage section 27 (cf. FIG. 3). Thus, the parameter storage section 27 can maintain the voice recognition parameters optimized by the voice recognition section 34. Here, the parameter storage section 27 comprises a piece of nonvolatile media, preferably a flash memory. Alternatively, the parameter storage section 27 may comprise a hard disk. Hence, the voice recognition parameters once optimized are maintained regardless of power-up/down of the DTV 20.

When the power is turned on again, the voice recognition section 34 can achieve the rapid optimization of new parameters based on the voice recognition parameters stored in the parameter storage section 27.

Figure 7:
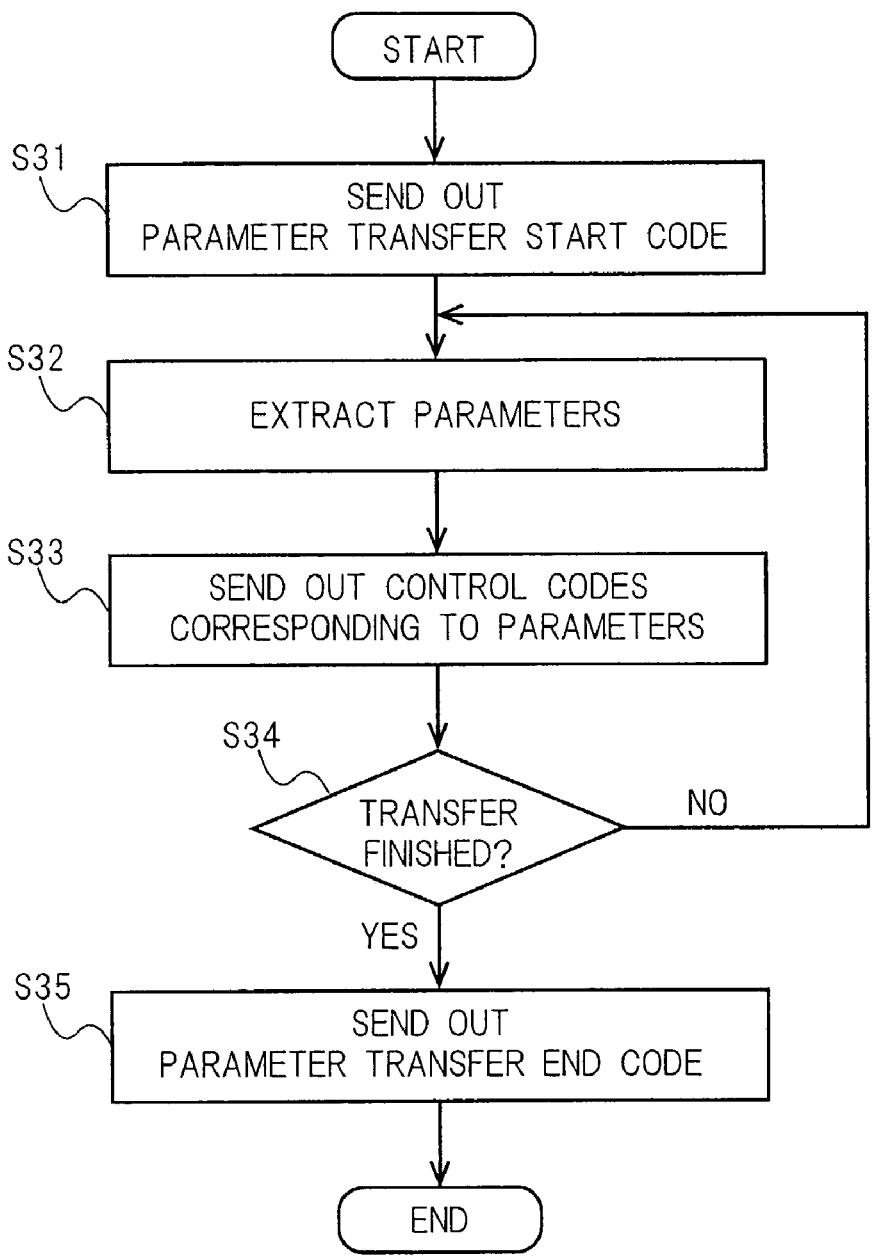
FIG. 7 is a flowchart showing the details of sending of voice recognition parameters concerning the voice-signal/remote-control-pulse converter 30 according to Example 1 of the invention.

The voice recognition parameters optimized by the voice recognition section 34 are sent out to the device controller 25 and stored in the parameter storage section 27 through the following steps. FIG. 7 is a flowchart showing the details of the sending out of the voice recognition parameters by the voice-signal/remote-control-pulse converter 30.

\<Step S31\>

The voice recognition section 34 instructs the output controller 36 to extract the voice recognition parameters. Then, the output controller 36 reads from the control code storage section 37 a control code indicating the start of transfer of the voice recognition parameters, hereafter referred to as parameter transfer start code, converts the parameter transfer start code into second remote control pulses P2, and sends out the second remote control pulses P2.

\<Step S32\>

The output controller 36 extracts the voice recognition parameters from the voice recognition section 34.

\<Step S33\>

The output controller 36 reads from the control code storage section 37 the control codes indicating the types and values of the voice recognition parameters extracted from the voice recognition section 34. The output controller 36 further converts the control codes sequentially into second remote control pulses P2, and sends out the second remote control pulses P2.

\<Step S34\>

The output controller 36 accesses the voice recognition section 34 and judges whether some of the voice recognition parameters remain to be extracted or not. When some of the voice recognition parameters remain yet to be sent out, the process returns to Step S32. When all the voice recognition parameters have been transferred, the process goes to Step S35.

\<Step S35\>

The output controller 36 reads from the control code storage section 37 a control code indicating the end of transfer of the voice recognition parameters, hereafter referred to as parameter transfer end code, converts the parameter transfer end code into second remote control pulses P2, and sends out the second remote control pulses P2.

Figure 8:
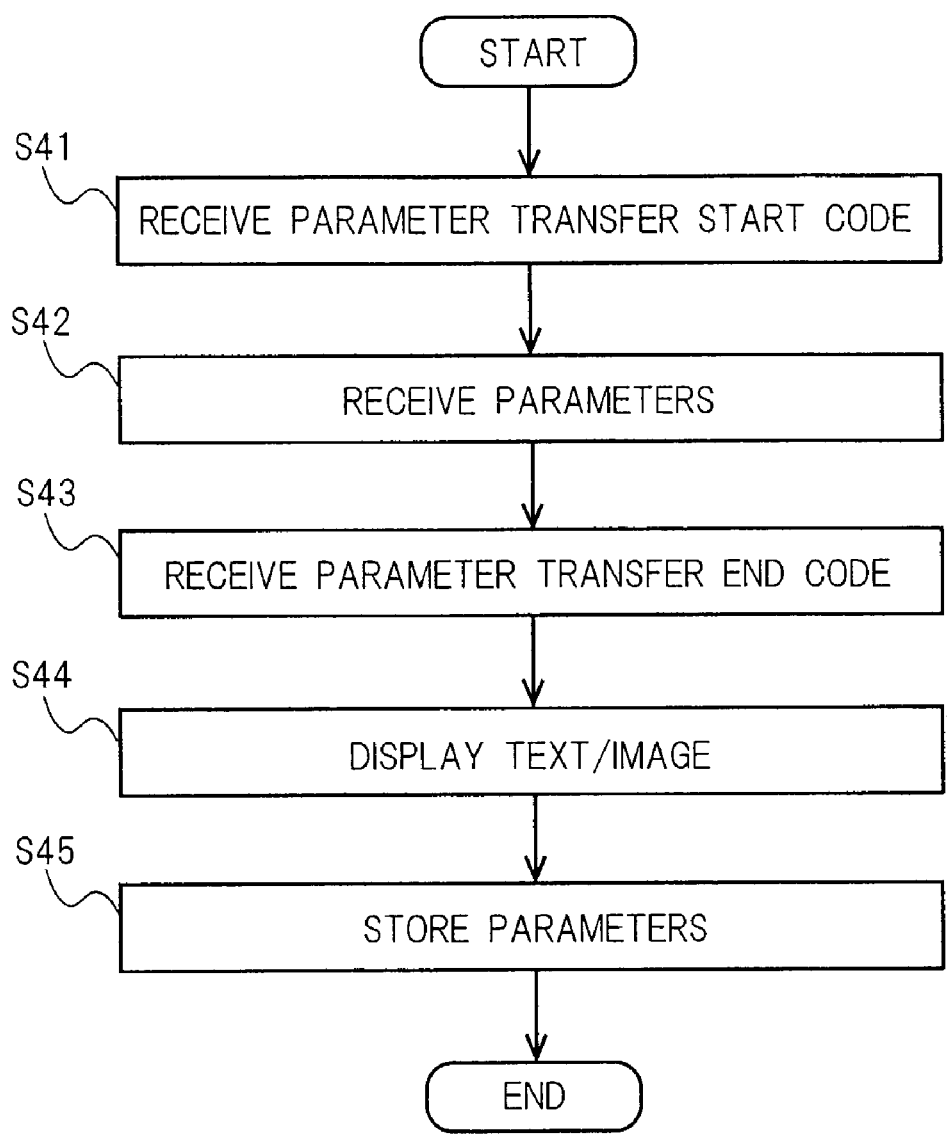
FIG. 8 is a flowchart showing the details of receiving and storing of voice recognition parameters concerning the device controller 25 according to Example 1 of the invention.

FIG. 8 is a flowchart showing the details of the receiving and storing of the voice recognition parameters by the device controller 25.

\<Step S41\>

The remote control pulse decoder 24 decodes the second-remote control pulses P2 into a parameter transfer start code, and then notifies the device controller 25 of the parameter transfer start code. Then, the device controller 25 understands that the subsequent control codes to be entered indicate the voice recognition parameters.

\<Step S42\>

The remote control pulse decoder 24 decodes the second remote control pulses P2 into control codes, and then notifies the device controller 25 of the control codes. The device controller 25 reads from the control data storage section 26 the voice recognition parameters corresponding to the control codes. The read sequence of the voice recognition parameters is temporarily stored in a buffer.

<Step S43>

The remote control pulse decoder 24 decodes the second remote control pulses P2 into a parameter transfer end code, and then notifies the device controller 25. Then, the device controller 25 reads from the control data storage section 26 items of text data and/or image data corresponding to the voice recognition parameters temporarily stored in the buffer.

<Step S44>

The device controller 25 causes the screen display section 28 to display the text data and/or the image data read in Step S43 on the TV screen. Then, the types and values of the parameters are fed back to the user. The user can easily adjust pronunciations, speeds, intonations, and loudness likely to succeed in recognition according to the parameters.

<Step S45>

The device controller 25 further writes the values of the voice recognition parameters temporarily stored in the buffer into the parameter storage section 27 on a type-by-type basis.

Thus, the parameter storage section 27 stores the voice recognition parameters, thereby maintaining the history of learning about the voice recognition regardless of power-up/down of the DTV 20. As a result, the rapid optimization of the voice recognition parameters can be achieved at turn-on again according to the history stored in the parameter storage section 27.

The DTV 20 according to Example 1 achieves the following GUI using the above-mentioned remote control system. The user presses the talk button 8 on the remote control transmitter 10 (cf. FIG. 1). Then, the second infrared LED 4V emits light (cf. FIG. 2). In the voice-signal/remote-control-pulse converter 30 of the DTV 20, the FM detector 32 detects the carrier from the second infrared LED 4V through the second photoreceptor 31 (cf. FIG. 3). The carrier detector 33 detects that the amplitude of the carrier increases and exceeds a constant level and asserts the voice recognition startup signal T. Then, the voice recognition section 34 starts up and begins the process of voice recognition.

The voice recognition section 34 notifies the output controller 36 of the start of voice recognition. The output controller 36 then accesses the control code storage section 37 and reads a control code corresponding to the command for notifying of the start of voice recognition, namely a recognition start code.

Table 1 is an example of a list of the correspondences between commands/parameters relevant to voice recognition and control codes, and a list of the correspondences between the operations of the DTV 20 performed according to the control codes and text/image data displayed on the TV screen 28A.

TABLE 1

| Command/ Parameter | Control code Category/Data | Operation of DTV | Image | Text |
|---|---|---|---|---|
| Start voice recognition | 0F/FE | Display voice recognition panel | Pattern 1 | Text 1 |
| End voice recognition | 0F/F0 | Erase voice recognition panel | None | None |
| Notify of microphone test result (OK) | 08/52 | Display microphone test OK | Pattern 5 | Text 16 |
| Notify of microphone test result (NG) | 08/53 | Display microphone test NG | Pattern 4 | Text 17 |

TABLE 1-continued

| Command/ Parameter | Control code Category/Data | Operation of DTV | Image | Text |
|---|---|---|---|---|
| Start parameter transfer | 0E/10 | Start to extract parameters | Pattern 5 | None |
| End parameter transfer | 0E/11 | End the extracting parameters | Pattern 5 | None |
| Notify of formant level α (−3) | 08/60 | Display value of α | Pattern 5 | None |
| Notify of formant level α (−2) | 08/61 | Display value of α | Pattern 5 | None |
| Notify of formant level α (−1) | 08/62 | Display value of α | Pattern 5 | None |
| Notify of formant level α (±0) | 08/63 | Display value of α | Pattern 5 | None |
| Notify of formant level α (+1) | 08/64 | Display value of α | Pattern 5 | None |
| Notify of formant level α (+2) | 08/65 | Display value of α | Pattern 5 | None |
| Notify of formant level α (+3) | 08/66 | Display value of α | Pattern 5 | None |
| ... | ... | ... | ... | ... |

Here, the correspondences between the first column and the second column are stored in the control code storage section 37 in the voice-signal/remote-control-pulse converter 30 (cf. FIG. 3). The correspondences among the third through fifth columns are stored in the control data storage section 26. The output controller 36 accesses the control code storage section 37 and refers to an equivalent to the first column and the second column of Table 1. Thus, the output controller 36 reads the recognition start code "0F/FE", further converts it into second remote control pulses P2, and sends out the second remote control pulses P2 to the device controller 25.

The device controller 25 receives the recognition start code "0F/FE" that the remote control pulse decoder 24 decodes the second remote control pulses P2 into, and then accesses the control data storage section 26 and refers to an equivalent to the second column and the third through fifth columns of Table 1. Thus, the device controller 25 reads the command and the items of text data and image data corresponding to the recognition start code "0F/FE". In the example shown in Table 1, the following are read (cf. FIG. 1): the command for indicating display of an image "voice recognition panel" A1 on the TV screen 28A; "Pattern 1" as an item of image data IM appearing on the "voice recognition panel" A1; and "Text 1" as an item of text data TX appearing on the "voice recognition panel" A1. FIG. 9 illustrates items of the image data appearing on the TV screen 28A in response to the respective control codes. Here, the items of the image data may be a single still image such as Patterns 4 and 5, or a series of moving images such as Patterns 1–3. Table 2 is an example of items of the text data appearing on the TV screen 28A in response to the respective control codes.

TABLE 2

| Text | Content | |
|---|---|---|
| Text 1 | "Please speak" | |
| Text 2 | "Now tuning to " . . . " " | => "Tuned to " . . . " " |
| Text 3 | "Performing " . . . " | => "Performed " . . . " " |
| Text 4 | "Ready to display " . . . " " | => "Displayed " . . . " " |
| Text 5 | "Searching " . . . " | => "Found " . . . " " |
| Text 6 | "Moving over " . . . " | => "Push "ENTER" for execution" |
| Text 7 | "Fail to recognize" | |
| Text 8 | "Please speak a little louder" | |
| Text 9 | "Please suppress your voice a little" | |
| Text 10 | "Please speak more briefly" | |
| Text 11 | "Please speak more clearly" | |
| Text 12 | "Please speak again" | |
| Text 13 | "Please hold the talk button during speaking" | |
| Text 14 | "Please press the talk button and speak" | |
| Text 15 | "Now checking sound quality. Please wait" | |
| Text 16 | "Adjustment is done" | |
| Text 17 | "Please try again" | |
| . . . | . . . | |

Under the control according to the command read from the control data storage section 26, the device controller 25 causes the screen display section 28 to display the voice recognition panel A1 on the TV screen 28A as shown in FIG. 1. In the example of FIG. 1, especially, "Pattern 1" in FIG. 9 and "Text 1" in Table 2 appear on the voice recognition panel A1. Thus, the user is notified of being ready for voice recognition by the DTV 20. Then, the user can understand an accurate timing of the start of speaking after pressing the talk button 8 on the remote control transmitter 10.

The user speaks, for example, words "channel one" indicating the number of a target channel with pressing and holding the talk button 8 on the remote control transmitter 10 (cf. FIG. 1). The series of the voices V is entered as a voice signal S through the microphone 5 and the low-frequency amplifier 6 in the remote control transmitter 10. The voice signal S is processed through a frequency modulation, converted into a voice signal RV based on infrared rays from the second infrared LED 4V, and then sent out (cf. FIG. 2). In the voice-signal/remote-control-pulse converter 30 of the DTV 20, the FM detector 32 detects the voice signal RV from the second infrared LED 4V through the second photoreceptor 31, and decodes it into the original voice signal S (cf. FIG. 3). The voice recognition section 34 compares the decoded voice signal S with each of the words W cataloged into the dictionary 35, thereby calculating the likelihoods and determining the first candidate words W according to predetermined criteria based on the likelihoods. When the voice recognition is successfully performed, the words "channel one" cataloged into the dictionary 35 are correctly determined as the first candidate words W for the above-mentioned voices "channel one".

The output controller 36 extracts the first candidate words W from the voice recognition section 34, and then accesses the control code storage section 37. Table 3 is an example of a list of the correspondences between words cataloged into the dictionary 35 and control codes, and a list of the correspondences between the operations of the DTV 20 performed according to the control codes and items of text data and image data appearing on the TV screen 28A.

TABLE 3

| Words | Control code Category/Data | Operation of DTV | Image | Text |
|---|---|---|---|---|
| "channel one" | 00/00 | Tune to Position 1 | Pattern 2 | Text 2 |
| "channel two" | 00/01 | Tune to Position 2 | Pattern 2 | Text 2 |
| "BS one eight one" | 00/13 | Tune to BS 181 | Pattern 2 | Text 2 |
| "BS Fuji" | 00/13 | Tune to BS 181 | Pattern 2 | Text 2 |
| "weather news" | 03/35 | Tune to BS 910 | Pattern 2 | Text 2 |
| "turn up the volume" | 03/93 | Turn up volume | Pattern 2 | Text 3 |
| "turn down the volume" | 03/94 | Turn down volume | Pattern 2 | Text 3 |
| "adjust picture quality" | 06/30 | Display adjustment picture-quality screen | Pattern 2 | Text 4 |
| "soccer" | 03/F3 | Search by genre "soccer" with EPG | Pattern 2 | Text 5 |
| "recording" | 05/1F | Move cursor over recording button | Pattern 2 | Text 6 |
| "microphone test" | 0F/9F | Display microphone test screen | Pattern 4 | Text 15 |
| . . . | . . . | . . . | . . . | . . . |

Here, the correspondences between the first column and the second column are stored in the control code storage section 37 in the voice-signal/remote-control-pulse converter 30 (cf. FIG. 3). The correspondences between the third through fifth columns are stored in the control data storage section 26. The output controller 36 accesses the control code storage section 37 and refers to an equivalent to the first column and the second column of Table 3. Then, the output controller 36 reads the control code "00/00" corresponding to the words "channel one", and then converts the control code into second remote control pulses P2 and sends out the second remote control pulses P2 to the device controller 25. The device controller 25 receives the control code "00/00" into which the remote control pulse decoder 24 decodes the second remote control pulses P2. Then, the device controller 25 accesses the control data storage section 26 and refers to an equivalent to the second column and the third through fifth columns of Table 3, thereby reading a command and items of text data and image data corresponding to the control code "00/00". In the example shown in Table 3, the following are read: a command for indicating to a TV tuner its tuning to Position 1 corresponding to the channel number "1", "Pattern 2" (cf. FIG. 9) as items of the image data IM appearing on the voice recognition panel A1 (cf. FIG. 1), and "Text 2" (cf. Table 2) as items of the text data item TX appearing on the voice recognition panel A1. Here, the mark ". . . " in the contents of Text 2 in Table 2 is replaced with an item of text data such as "CH 1" indicating the target channel number. First, the device controller 25 causes the screen display section 28 under control to display "Pattern 2" and the first sentence "Now tuning to "CH 1" in "Text 2" on the TV screen 28A. Next, the device controller 25 causes a TV tuner (not shown) under control to tune to Position 1. Furthermore, the device controller 25 causes the screen display section 28 under control to display the second sentence "Tuned to "CH 1" in "Text 2" on the TV screen 28A. Thus, the user is notified of the performance of the channel selection and the selected channel number based on the voices recognized. Accordingly, the user can clearly understand what the DTV 20 recognizes according to the indications by means of the voices.

The control codes available to the indications by means of voices is not restricted in number in contrast to the control codes available to key operations on the remote control transmitter 10. As illustrated in Table 3, the variety of the voice-actuated functions including channel selection is quite wide. For example, when the user speaks a word "soccer", first, the first sentence "Searching for "soccer" in "Text 5" appears as the item of the text data TX on the TV screen 28A. Next, a search by the genre "soccer" is performed with EPG, and the search results appears on the TV screen 28A in list form together with the second sentence "Found "soccer" in "Text 5". Here, when an operation that the user indicates require a relatively long time for the process, such as a channel selection and a search with EPG, the DTV 20 changes the text data TX before and after performing the operation, as shown in "Text 2" or "Text 5". Thus, the user can clearly understand that the voice-actuated operation is underway in the DTV 20. This can cause the user to feel the time for the process shortening.

The voice recognition section 34, when it cannot determine the first candidate words or when it detects the "carrier loss during speaking", judges an occurrence of a recognition error and aborts the recognition process. Then, the voice recognition section 34 notifies the output controller 36 of the items of information on the recognition error organized by the factors. The output controller 36 reads from the control code storage section 37 the control code corresponding to the received items of the information, namely the error code. Table 4 is an example of a list of the correspondences between the descriptions of recognition errors and error codes and a list of the items of text data and image data appearing on the TV screen 28A according to-the error codes.

TABLE 4

| Description of recognition error | Error code Category/Data | Image | Text |
|---|---|---|---|
| Fail to recognize (except below) | 0F/00 | Pattern 3 | Text 7 |
| Too faint voices or Too low S/N | 0F/01 | Pattern 3 | Text 8 |
| Too loud voices | 0F/02 | Pattern 3 | Text 9 |
| Speak for too long a time | 0F/03 | Pattern 3 | Text 10 |
| Unclear speaking (lack of likelihood) | 0F/04 | Pattern 3 | Text 11 |
| Not ready to receive voices | 0F/05 | Pattern 3 | Text 12 |
| Release the talk button during speaking | 0F/06 | Pattern 3 | Text 13 |
| Start to speak before pressing the talk button | 0F/07 | Pattern 3 | Text 14 |
| . . . | . . . | . . . | . . . |

Here, the correspondences between the first column and the second column are stored in the control code storage section 37 (cf. FIG. 3). The correspondences between the second column and the third and fourth columns are stored in the control data storage section 26. The output controller 36 accesses the control code storage section 37 and refers to an equivalent to the first column and the second column of Table 4. For example, when the recognition error received is the "carrier loss during speaking", the output controller 36 reads the error code "0F/06", converts the error code into second remote control pulses P2, and sends out the second remote control pulses P2 to the device controller 25. The device controller 25 receives the error code "0F/06" into which the remote control pulse decoder 24 decoded the second remote control pulses P2. Then, the device controller 25 accesses the control data storage section 26 and refers to an equivalent to the second column and the third and fourth columns of Table 4, thereby reading items of text-data and image data corresponding to the error code "0F/06". In the example shown in Table 4, the following are read: "Pattern 3" and "Text 13" as items of the image data IM and the text data TX appearing on the "voice recognition panel" A1, respectively. The device controller 25 causes the screen display section 28 under control to display "Pattern 3" and "Text 13" on the TV screen 28A. As a result, the user can understand that a recognition error occurs since the infrared rays has cut off, for example, on release of the talk button during speaking.

As shown in Table 4, various factors may affect recognition errors. The voice recognition section 34 cannot recognize the words indicated by the voice signal, for example, when the loudness or formant of the user's voice or the timing of the speaking is inappropriate, when the S/N is too low because of excessive levels of ambient noises, or when words pronounced are wrong. In addition, the likelihoods of the words recognized do not meet predetermined criteria for any words cataloged into the dictionary 35. For example, when the voice recognition section 34 judges that the microphone 5 of the remote control transmitter 10 receives excessive levels of voices, the device controller 25 sends out the error code "0F/02" corresponding to an error description "too loud voices" of the recognition errors. The device controller 25 displays "Text 9" (cf. Table 2) and "Pattern 3" (cf. FIG. 9) corresponding to the error code "0F/02" on the TV screen 28A. Then, the user can easily understand that recognition errors occur because of excessive voice levels. Accordingly, the user can devise a method of avoiding the recognition errors in the renewed indications by means of voices, for example, reducing the voice levels. The user is notified of recognition errors of the DTV 20 together with the details of the errors as described above. Thus, the user can appropriately avoid a reoccurrence of the recognition errors in the renewed indications by means of voices.

The user may further carry out a "microphone test", that is, an optimization of the voice recognition parameters with the voice recognition section 34, as follows. The user speaks "microphone test". When the voice recognition section 34 recognizes the voices as proper words "microphone test", the output controller 36 sends out the control code "0F/9F" (cf. Table 3) corresponding to the words to the device controller 25. The device controller 25 reads from the control data storage section 26 a command and items of text data and image data corresponding to the control code "0F/9F". In the example shown in Table 3, the following are read: a command for indicating display of an image "microphone test screen" A2 (cf. FIG. 1) on the TV screen 28A, "Text 15" (cf. Table 2) as an item of the text data TX appearing on the "voice recognition panel" A1, and "Pattern 4" (cf. FIG. 9) as an item of the image data IM appearing on the "microphone test screen" A2. The device controller 25 controls the screen display section 28 according to the command, thereby displaying the "microphone test screen" A2 and the "Text 15" on the TV screen 28A. The voice recognition section 34 optimizes the voice recognition parameters according to the user-specific formant based on the voices "microphone test". More specifically, the voice recognition section 34 defines a formant level as an index of frequency-versus-power spectrum shift depending on vocal tract length and analyzes an optimum value α of the formant level corresponding to the highest likelihood. When the voice recognition section 34 succeeds in optimization of the voice recognition parameters, the output controller 36 sends out to the device controller 25 the control code "08/52" (cf. Table 1) corresponding to the command "Notify of microphone test result (OK)" for notifying of the success in optimization of the voice recognition parameters. Then, the device controller 25 displays "Text 16" (cf. Table 2) and "Pattern 5" (cf. FIG. 9) on the TV screen 28A. The output controller 36 next extracts from the voice recognition section 34 the optimized values of the voice recognition parameters including the optimum value α of the formant level. For example, when the optimum value α of the formant level equals −2, the output controller 36 sends out to the device controller 25 the control code "08/61" (cf. Table 1) corresponding to a command for notifying of the formant level α=−2. Then, the device controller 25 matches the formant level appearing as "Pattern 5" with the optimum value α received. Here, "Pattern 5" is illustrated in FIG. 9 as an image indicating "the formant level α=−2". When the optimum value α of the formant level is another value, the position of the indicator G and the value H of the formant level shown in "Pattern 5" change according to the optimum value. Through the display, the user can clearly understand that the voice recognition section 34 can achieve the optimization of the voice recognition parameters.

When the voice recognition section 34 succeeds in the optimization of the voice recognition parameters, the optimized values of the voice recognition parameters may be stored in the parameter storage section 27 (cf. FIG. 3) as follows. The output controller 36 sends out the parameter transfer start code "0E/10" (cf. Table 1) to the device controller 25. Furthermore, the output controller 36 sends out to the device controller 25 the series of the control codes corresponding to the respective optimized values of the voice recognition parameters. On completion of sending out of all the parameters, the output controller 36 sends out the parameter transfer end code "0E/11" (cf. Table 1) to the device controller 25. The device controller 25, after receiving the parameter transfer start code, transfers in sequence the voice recognition parameters corresponding to the respective control codes in the series received from the output controller 36 from the control data storage section 26 to a buffer. On receiving the parameter transfer end code, the device controller 25 stores into the parameter storage section 27 a series of the voice recognition parameters accumulated in the buffer. Thus, the optimized values of the voice recognition parameters are stored in pieces of the nonvolatile media in the parameter storage section 27. Accordingly, the history of learning in the voice recognition can be maintained regardless of power-up/down of the DTV 20. As a result, the rapid optimization of the voice recognition parameters can be achieved at turn-on again according to the history of the voice recognition parameters stored in the parameter storage section 27.

When the voice recognition section 34 fails to recognize the user's voice "microphone test", or fails to optimize the voice recognition parameters, the output controller 36 sends out to the device controller 25 the control code "08/53" (cf. Table 1) corresponding to the command "Notification of microphone test result (NG)" for notifying of the failure of optimization of the voice recognition parameters. Then, the device controller 25 displays "Text 17" (cf. Table 2) and "Pattern 4" (cf. FIG. 9) on the TV screen 28A. Through the display, the user can clearly understand that the voice recognition section 34 is in a state of not achieving proper optimization of the voice recognition parameters. Then, the user devises measures of, for example, control over ambient noises.

The remote control system according to Example 1 uses infrared rays as the communication medium. Alternatively, radio waves may be used as the communication medium. In this case, cellular phones, microcellular phones, or PDAs may be used as the remote control transmitter 10. Voice signals of high quality can be transmitted especially by microcellular phones, the third-generation mobile communication terminals with the adoption of W-CDMA, and Bluetooth-compatible communication terminals. Accordingly, use of these terminals in transmission of the voice signals can achieve more reliable voice recognition of the remote control system according to Example 1.

EXAMPLE 2

An image-processing apparatus according to Example 2 of the invention is a DTV similar to that of Example 1, and is equipped with a remote control system based on key operations on a remote control transmitter and voices. In contrast to Example 1, the remote control transmitter does not comprise a voice input section and the DTV as a remote-controlled apparatus directly receives the user's voices through a microphone instead. Example 2 comprises other components of the configuration and operations in common with Example 1.

Figure 10:
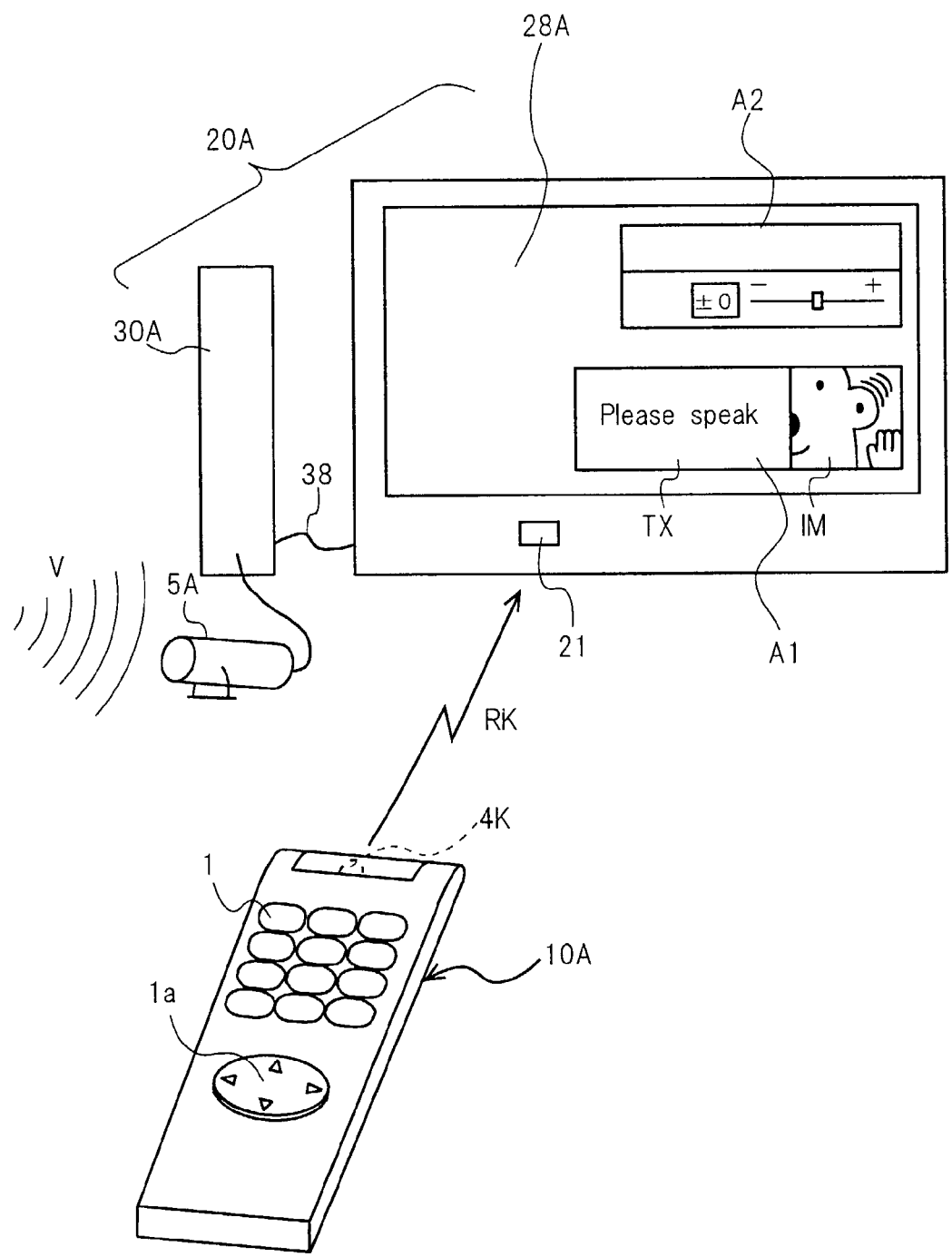
FIG. 10 is a schematic diagram showing the appearance of a remote control system with a DTV 20A according to Example 2 of the invention.

FIG. 10 is a schematic diagram showing the appearance of a remote control system with a DTV 20A according to Example 2 of the invention. A user presses a key of a keypad 1 on a remote control transmitter 10A. Then, an item of control information corresponding to the key, such as a target channel number, is transmitted as a remote control signal RK based on, for example, infrared rays from an infrared LED 4K to the DTV 20A. The remote control signal RK is received by a photoreceptor 21 of the DTV 20A and decoded into the corresponding item of the control information. Then, an operation indicated by the control information is performed. For example, a program on a channel corresponding to each key of the keypad 1 appears on a TV screen 28A. Thus, the remote control is achieved by means of key operations on the remote control transmitter 10A.

The user enters a voice V indicating an item of control information for the DTV 20A, such as a target channel number, into a microphone 5A of the DTV 20A. Here, the microphone 5A is connected to a voice-signal/remote-control-pulse converter 30A of the DTV 20A. The user's voice V is directly entered into the voice-signal/remote-control-pulse converter 30A through the microphone 5A, thereby being decoded into the corresponding item of control information. The control information decoded is transmitted to the main body of the DTV 20A through, for example, a cable 38, and then an operation indicated by the control information is performed. For example, a program on the target channel indicated by the voice V appears on the TV screen 28A. Thus, the remote voice-actuated control is achieved.

Figure 11:
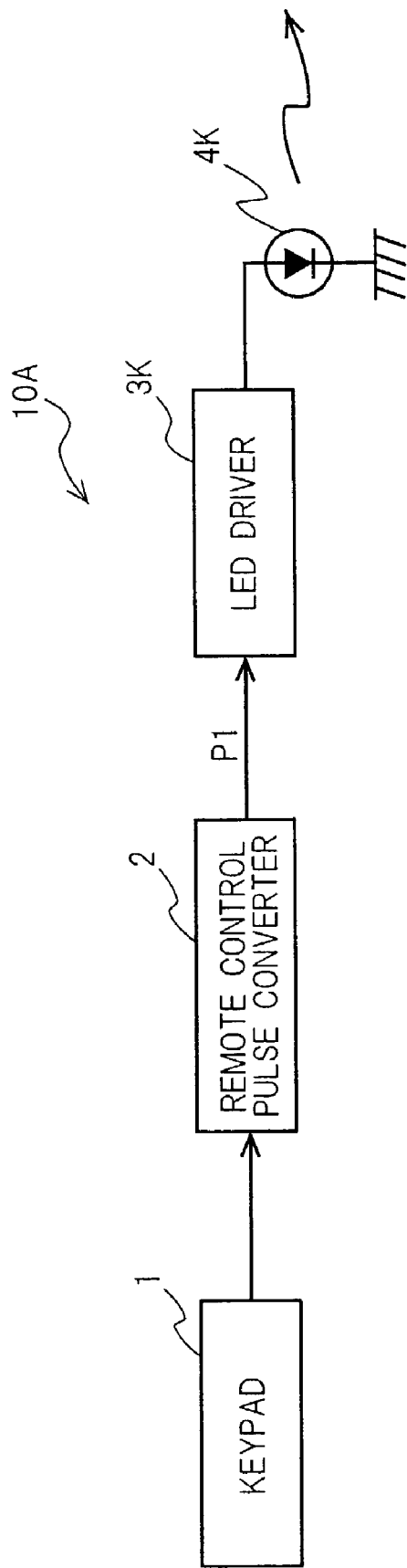
FIG. 11 is a block diagram showing the configuration of a remote control transmitter 10A included by the remote control system according to Example 2 of the invention.

Regarding Example 2, the following describes modifications of Example 1. Regarding commonalities with Example 1, the description of Example 1 is cited. FIG. 11 is a block diagram showing the configuration of the remote control transmitter 10A included by the above-mentioned remote control system according to Example 2. Here, the same reference symbols as those shown in FIG. 2 designate components similar to those of the remote control transmitter 10 according to Example 1, and the description of Example 1 is cited regarding the similar components. As clarified from comparison between FIGS. 2 and 11, the remote control transmitter 10A according to Example 2 is substantially equivalent to the remote control transmitter 10 according to Example 1 except a part relevant to a voice input.

Figure 12:
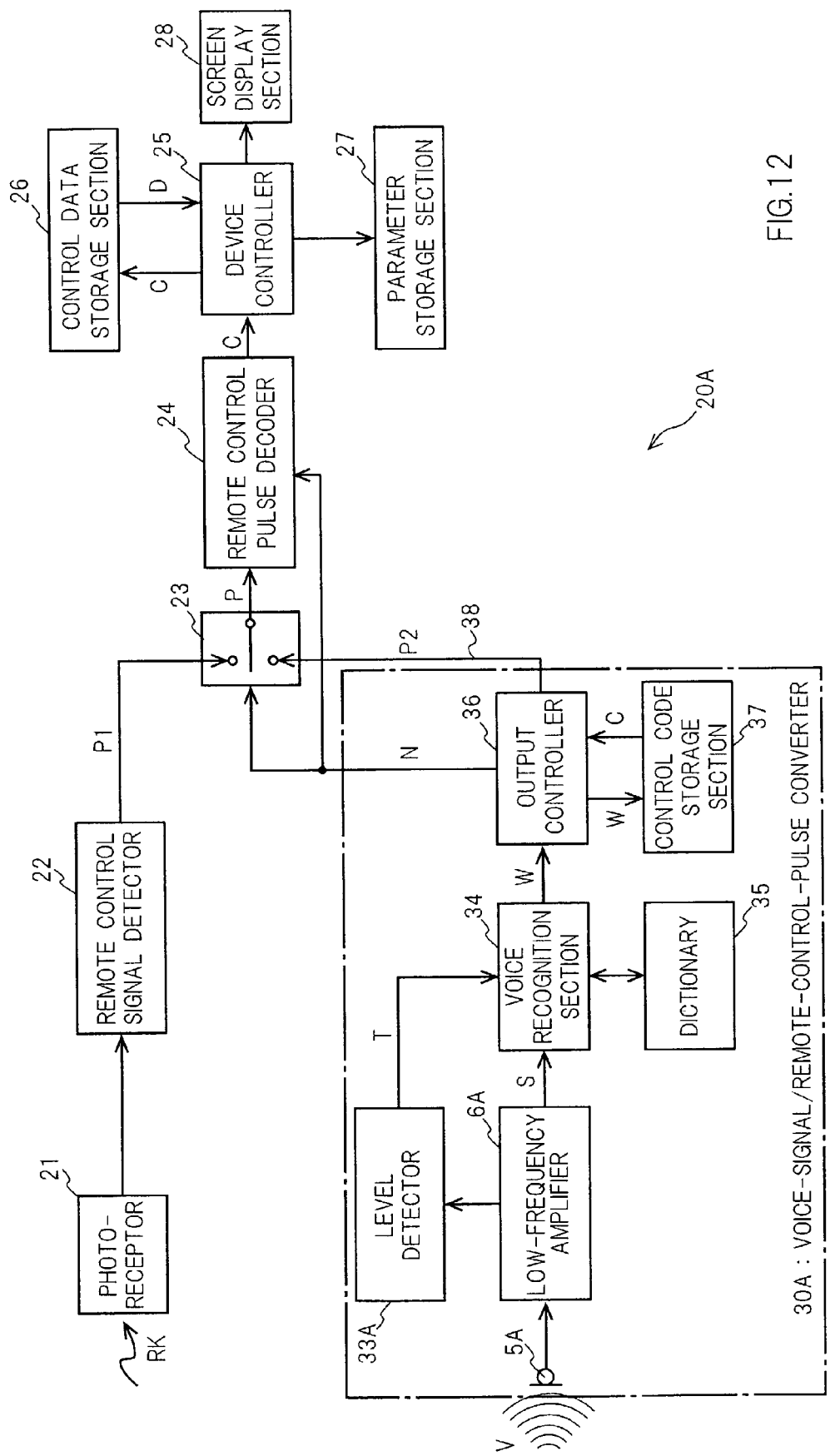
FIG. 12 is a block diagram showing a part relevant to the remote control system in the DTV 20A according to Example 2 of the invention.
Figure 13:
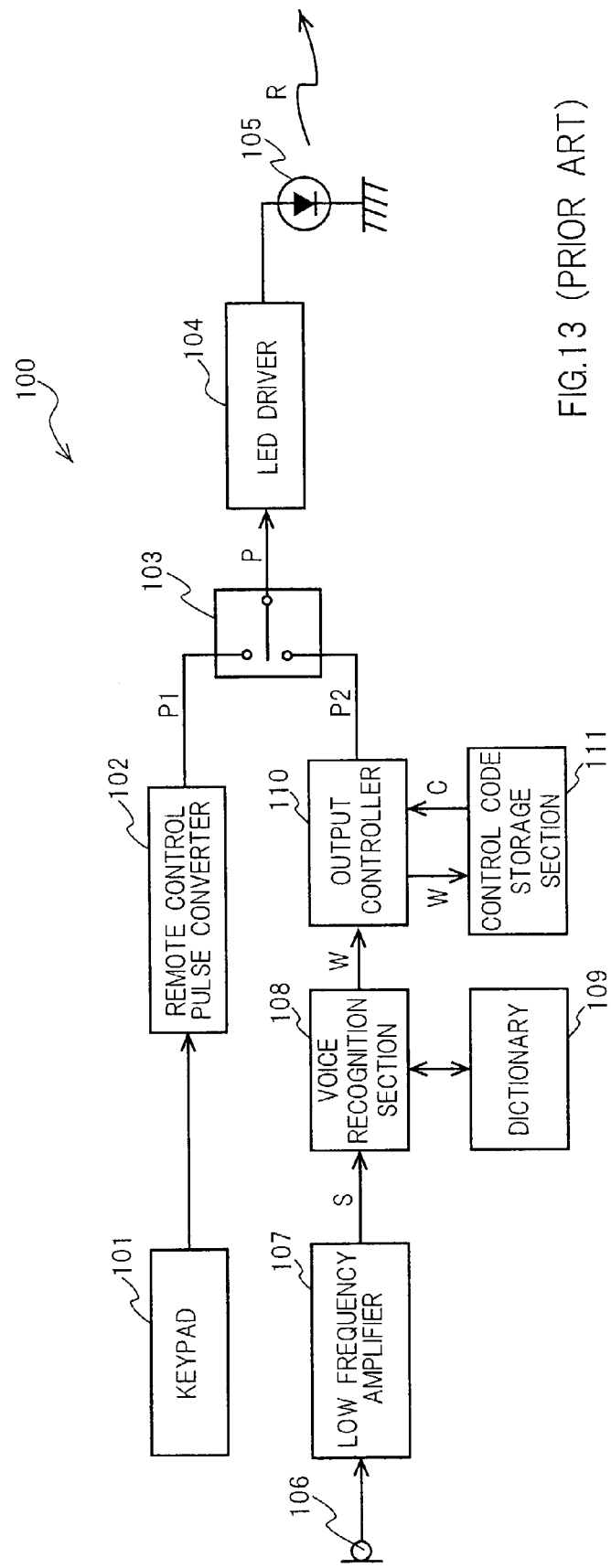
FIG. 13 is a block diagram showing the configuration of a remote control transmitter 100 included by an example of conventional remote control systems.
Figure 14:
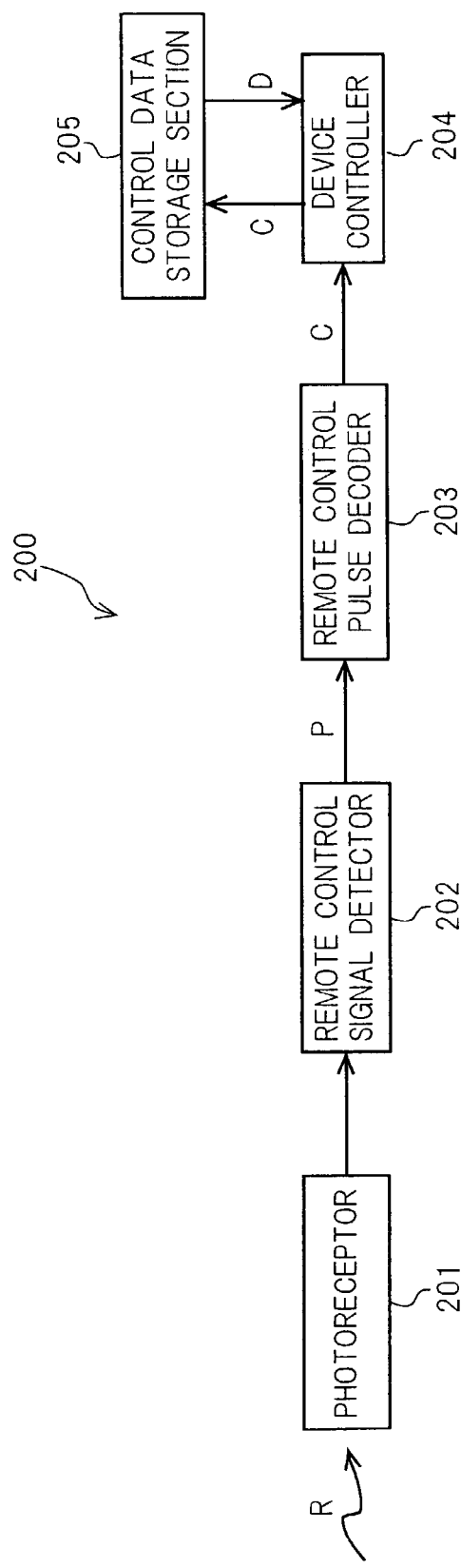
FIG. 14 is a block diagram showing a part relevant to remote control in the remote-controlled apparatus, that is, a VTR 200 in the example of conventional remote control systems.
Figure 15:
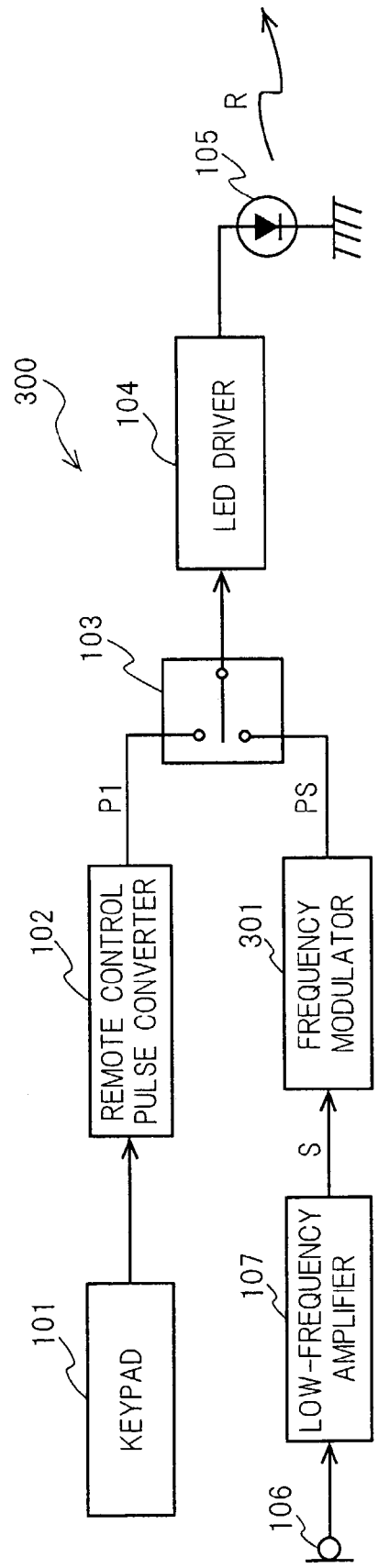
FIG. 15 is a block diagram showing the configuration of a remote control transmitter 300 included by another example of conventional remote control systems.
Figure 16:
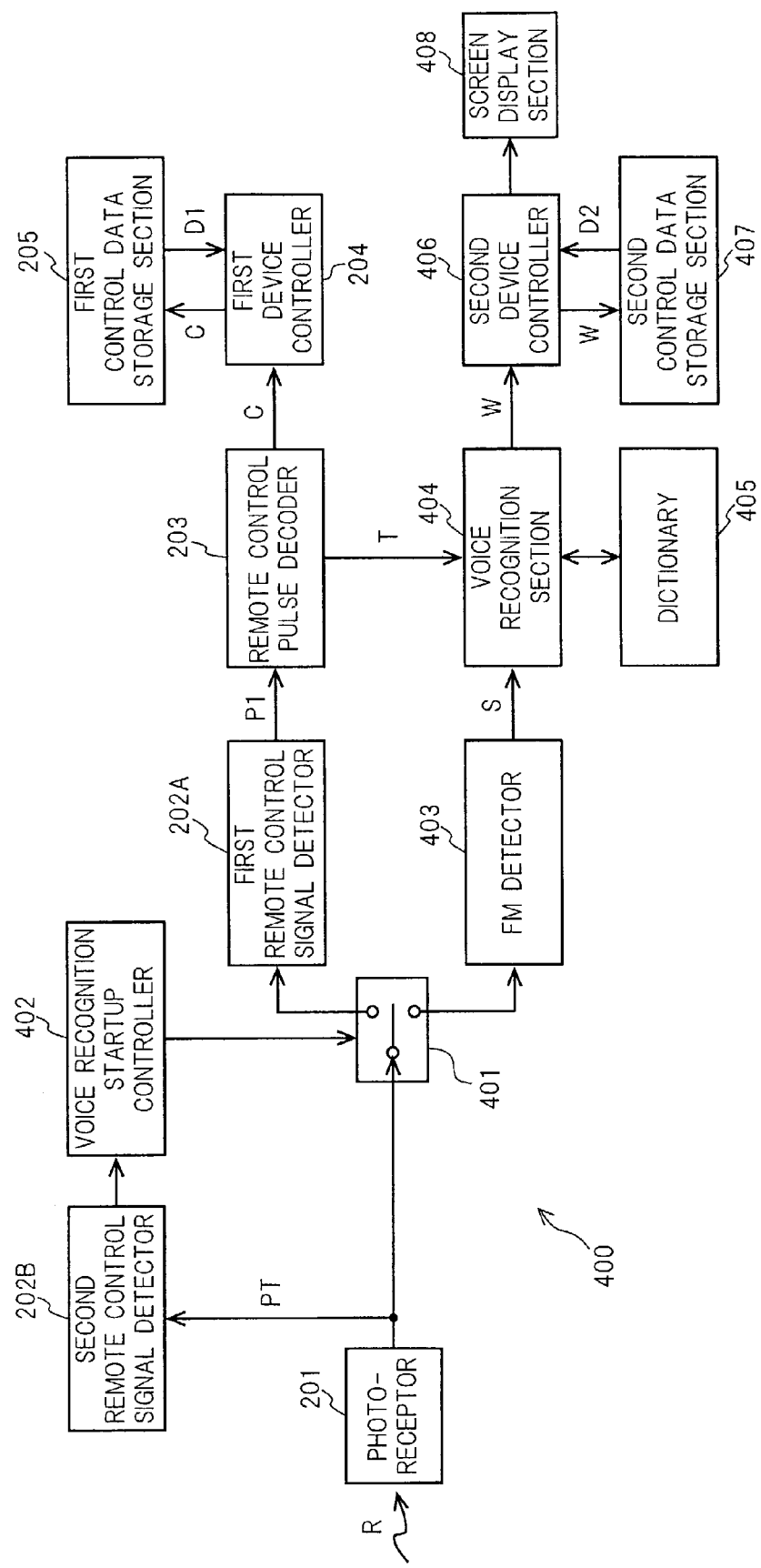
FIG. 16 is a block diagram showing a part relevant to remote control and voice recognition in the remote-controlled apparatus, that is, a VTR 400 in another example of conventional remote control systems.

FIG. 12 is a block diagram showing a part relevant to a remote control system in the DTV 20A according to Example 2. Here, the same reference symbols as those shown in FIG. 3 designate components similar to those of the DTV 20 according to Example 1, and the description of Example 1 is cited regarding the similar components.

A voice-signal/remote-control-pulse converter 30A with the following configuration directly receives the voice V of the user, converts the voice into a voice signal S, and performs voice recognition on the signal. The items of control information indicated by the voice recognized are encoded in the format in common with the control codes indicated by the first remote control pulses P1, and are sent out as second remote control pulses P2 in the format in common with the first remote control pulses P1, in a manner similar to that of Example 1.

The microphone 5A receives the user's voice V and converts it into an electric signal. A low-frequency amplifier 6A extracts the frequency components corresponding to the voice V from the electric signal converted by the microphone 5A, and sends out the components as a voice signal S to the voice recognition section 34. The level detector 33A compares the amplitude of the voice signal S extracted by the low-frequency amplifier 6A with a constant level. When the amplitude of the voice signal S increases and exceeds the constant level, the level detector 33A asserts the voice recognition startup signal T for a constant duration. On the other hand, when the amplitude of the voice signal S is maintained below the constant level for a constant duration, the level detector 33A negates the voice recognition startup signal T.

The DTV 20A according to Example 2 directly receives user's voices, in contrast to the DTV 20 according to Example 1. This avoids the necessity of handling of recognition errors relevant to press-to-talk operation, that is, recognition errors due to the likes of releases of a talk button during speaking. Therefore, much of the load is taken off the voice recognition section 34 and the like.

The voice signal S once entered into the voice-signal/remote-control-pulse converter 30A is processed in a manner similar to that of Example 1. Accordingly, Example 2 achieves a remote control system similar to Example 1 except for the difference in voice inputs. Therefore, Example 2 delivers the following effects similar to that of Example 1. First, the remote control pulse decoder 24 and the device controller 25 are shared for both of the first remote control pulses P1 and the second remote control pulses P2, since both of the remote control pulses have a common format. In particular, these circuits are integrated into a single system similar to the prior art circuit. This simplifies the design of the chassis. Furthermore, the second remote control pulses P2 are transmitted only from the voice-signal/remote-control-pulse converter 30A to the remote control pulse selector 23 without leakage to the outside. Therefore, the control codes indicated by the second remote control pulses P2 may overlap the control codes of other remote control systems in contrast to the control codes indicated by the first remote control pulses P1. Thus, an abundance of the control codes is available to the items of control information indicated by voices in the remote control system according to Example 2. As a result, the remote control system has great potential for expansion in the functionality of being voice-actuated.

The remote-controlled apparatus according to the invention performs voice recognition. Then, the control information indicated by a voice signal recognized is converted into remote control pulses and sent out to the device controller. Thus, the control information to be processed by the device controller is expressed in the data form in common with that of the prior art, namely remote control pulses. Accordingly, the device controller permits a circuit configuration similar to that of the prior art to be shared, when the control information from the user is provided in either data form of remote control signals from the remote control transmitter and voice signals. In other words, the device controller is easily integrated as a single line similar to that of the prior art. As a result, the design of the chassis is simplified.

The remote control pulse selector enters the second remote control pulses into the remote control pulse decoder and interrupts the first remote control pulses sent out from the remote control receiver, when the voice-signal/remote-control-pulse converter sends out the second remote control pulses. Thus, the remote control pulse decoder processes exclusively one of the first remote control pulses and the second remote control pulses. Accordingly, a common control code may be assigned to separate functions between the first remote control pulses and the second remote control pulses. Furthermore, the voice-signal/remote-control-pulse converter and the remote control pulse selector maybe interconnected, for example, within a common cabinet or with a cable, in order to prevent a leak of the second remote control pulses out of the remote-controlled apparatus. The control codes indicated by the second remote control pulses may thereby overlap those of other remote control systems. As a result, arbitrary category codes and data codes may be assigned as the control codes indicated by the second remote control pulses. That is, the number of control codes indicated by the second remote control pulses is not restricted in contrast to the number of control codes indicated by the first remote control pulses. Thus, the above-mentioned remote-controlled apparatus achieves great potential for expansion in the functionality of being voice-actuated.

The image-processing apparatus according to the invention serves as a remote-controlled apparatus according to the invention, and may provide, for example, the following GUI, especially for indications by means of voices. The device controller controls the screen display section according to the indications by means of voices, thereby displaying the information about the voice recognition. Then, the information is visually fed back to the user. The items of such information include, for example, notifications of the proper timings of speaking, lists of words recognized and the candidates, and the details of operations recognized. In addition, information of errors, when the errors occur in the voice recognition, may appear on the screen. Through the feed back of such information displayed on the screen, the user easily adjusts, for example, pronunciations, speeds, intonations, and loudness likely to succeed in recognition. Thus, the image-processing apparatus according to the invention permits improvements in the operability, especially for the remote voice-actuated control.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

The invention claimed is:

1. A remote-controlled apparatus comprising:
   (A) a remote control receiver for receiving a remote control signal and converting the remote control signal into first remote control pulses;
   (B) a voice-signal/remote-control-pulse converter for receiving a voice signal, selecting a control code corresponding to the voice signal, converting the control code into second remote control pulses, and sending out a switching signal for selecting the second remote control pulses a predetermined first time interval before sending out the second remote control pulses, thereafter, sending the second remote control pulses, and stopping of sending out the switching signal a predetermined second time interval after sending out the second remote control pulses;
   (C) a remote control pulse selector for selecting the second remote control pulses in accordance with the switching signal, and for selecting the first remote control pulses in accordance with no switching signal; and
   (D) a remote-control-pulse processing section for decoding the remote control pulses selected by said remote control pulse selector into the control code and performing the control over operations according to the control code.

2. A remote-controlled apparatus according to claim 1, wherein
   (A) said voice-signal/remote-control-pulse converter comprises:
      (a) a dictionary including objects of voice recognition;
      (b) a voice recognition section for calculating the degree of similarity between said voice signal and each of said objects of voice recognition, and selecting one of a candidate for said object of voice recognition corresponding to said voice signal and an error code on the basis of the degrees of similarity;
      (c) a control code storage section for storing control codes each corresponding to said object of voice recognition and said error code; and
      (d) an output controller for reading a control code corresponding to one of the candidate for said object of voice recognition and said error code from said control code storage section, converting the control code into said second remote control pulses, and sending out said second remote control pulses to said remote control pulse selector together with said switching signal; and
   (B) said remote-control-pulse processing section comprises:
      (a) a remote control pulse decoder for decoding the remote control pulses selected by said remote control pulse selector, and converting the remote control pulses into a corresponding control code;
      (b) a control data storage section for storing control data and commands each corresponding to said control codes; and
      (c) a device controller for reading from said control data storage section an item of the control data and/or commands corresponding to the control code that said remote control pulse decoder decodes into, and performing a predetermined control over operations on the basis of the item of control data and/or commands.

3. A remote-controlled apparatus according to claim 2, wherein:
   (A) said remote-controlled apparatus comprises a parameter storage section including a piece of nonvolatile media;
   (B) said voice recognition section sends out voice recognition parameters to said output controller;
   (C) said control code storage section stores control codes corresponding to said voice recognition parameters;
   (D) said output controller reads said control code from said control code storage section, converts the control code into said second remote control pulses, and sends out the second remote control pulses to said remote control pulse selector;
   (E) said control data storage section stores said voice recognition parameters corresponding to said control codes; and
   (F) said device controller reads from said control data storage section said voice recognition parameters corresponding to said control code that said remote control pulse decoder decodes into, and writes the voice recognition parameters into said parameter storage section.

4. A remote-controlled apparatus according to claim 1, wherein said voice-signal/remote-control-pulse converter comprises: (A) a voice input section for receiving a user's voice and converting the voice into said voice signal; and (B) a startup controller for starting said voice-signal/remote-control-pulse converter according to the amplitude of said voice signal.

5. A remote control system comprising a remote-controlled apparatus and a remote control transmitter for transmitting a remote control signal, wherein said remote control transmitter comprises:
   (a) a voice input section for receiving a user's voice and converting the voice into a voice signal; and
   (b) a wireless transmitter for modulating a carrier based on supersonic waves, infrared rays, or radio waves, according to said voice signal and transmitting the carrier, and said remote-controlled apparatus comprises:
   (A) a remote control receiver for receiving the remote control signal and converting the remote control signal into first remote control pulses;
   (B) a voice-signal/remote-control-pulse converter for receiving the carrier, decoding the carrier into the voice signal, selecting a control code corresponding to the voice signal, converting the control code into second remote control pulses, and sending out a switching signal for selecting the second remote control pulses a predetermined first time interval before sending out the second remote control pulses, thereafter, sending the second remote control pulses, and stopping of sending out the switching signal a predetermined second time interval after sending out the second remote control pulses;
   (C) a remote control pulse selector for selecting the second remote control pulses in accordance with the switching signal, and for selecting the first remote control pulses in accordance with no switching signal; and
   (D) a remote-control-pulse processing section for decoding the remote control pulses selected by said remote control pulse selector into the control code and performing the control over operations according to the control code, and wherein said voice-signal/remote-control-pulse converter includes: (a) a wireless receiver for receiving said carrier; and (b) a startup controller for starting said voice-signal/remote-control-pulse converter according to the amplitude of said carrier.

6. An image-processing apparatus comprising a screen display section and a remote-controlled apparatus, wherein said remote-controlled apparatus comprises:
(A) a remote control receiver for receiving a remote control signal and converting the remote control signal into first remote control pulses;
(B) a voice-signal/remote-control-pulse converter comprising:
  (a) a dictionary including objects of voice recognition;
  (b) a voice recognition section for receiving a voice signal, calculating the degree of similarity between said voice signal and each of said objects of voice recognition, and selecting one of a candidate for said object of voice recognition corresponding to said voice signal and an error code on the basis of the degrees of similarity;
  (c) a control code storage section for storing control codes each corresponding to said object of voice recognition and said error code; and
  (d) an output controller for reading a control code corresponding to one of the candidate for said object of voice recognition and said error code from said control code storage section, converting the control code into said second remote control pulses, and sending out a switching signal for selecting the second remote control pulses a predetermined first time interval before sending out the second remote control pulses, thereafter, sending the second remote control pulses, and stopping of sending out the switching signal a predetermined second time interval after sending out the second remote control pulses;
(C) a remote control pulse selector for selecting the second remote control pulses in accordance with the switching signal, and for selecting the first remote control pulses in accordance with no switching signal; and
(D) a remote-control-pulse processing section comprising:
  (a) a remote control pulse decoder for decoding the remote control pulses selected by said remote control pulse selector, and converting the remote control pulses into a corresponding control code;
  (b) a control data storage section for storing the control data and commands for said screen display section and view data to be displayed by said screen display section in a manner of establishing respective correspondences with predetermined control codes; and
  (c) device controller for reading from said control data storage section said view data corresponding to the control code that said remote control pulse decoder decodes said second remote control pulses into, and causes said screen display section to display the view data, and wherein said screen display section displays a predetermined image under the control of said device controller.

7. An image-processing apparatus according to claim 6, wherein said view data include text data.

8. An image-processing apparatus according to claim 6, wherein said view data include image data.

* * * * *